(12) United States Patent
Raykhman

(10) Patent No.: US 7,171,386 B1
(45) Date of Patent: Jan. 30, 2007

(54) REAL-TIME COMMODITY TRADING METHOD AND APPARATUS

(75) Inventor: Dmitry A. Raykhman, Brookly, NY (US)

(73) Assignee: RFV Holdings, Tortola (VG)

( * ) Notice: Subject to any disclaimer, the term of this patent is extended or adjusted under 35 U.S.C. 154(b) by 745 days.

(21) Appl. No.: 09/415,392

(22) Filed: Oct. 8, 1999

(51) Int. Cl.
*G06F 40/00* (2006.01)
(52) U.S. Cl. ....................................... 705/37
(58) Field of Classification Search ................. 705/37, 705/36, 35
See application file for complete search history.

(56) References Cited

U.S. PATENT DOCUMENTS

| | | | |
|---|---|---|---|
| 4,412,287 A * | 10/1983 | Braddock, III | 705/37 |
| 4,677,933 A | 7/1987 | Rotella | |
| 4,903,201 A | 2/1990 | Wagner | |
| 4,980,826 A * | 12/1990 | Wagner | 705/37 |
| 5,136,501 A * | 8/1992 | Silverman et al. | 705/37 |
| 5,168,446 A | 12/1992 | Wiseman | |
| 5,297,031 A | 3/1994 | Gutterman et al. | |
| 5,809,483 A * | 9/1998 | Broka et al. | 705/37 |
| 5,845,265 A * | 12/1998 | Woolston | 705/27 |
| 5,924,082 A | 7/1999 | Silverman et al. | |
| 5,950,176 A * | 9/1999 | Keiser et al. | 705/35 |
| 6,029,146 A * | 2/2000 | Hawkins et al. | 235/379 |
| 6,247,000 B1 * | 6/2001 | Hawkins et al. | 705/37 |
| 6,317,728 B1 * | 11/2001 | Kane | 705/36 |

FOREIGN PATENT DOCUMENTS

WO    WO 200127836    *    4/2001

OTHER PUBLICATIONS

AAII Computerized Investing Newsletter. Equis International AAII—May/Jun. 1998.*

* cited by examiner

*Primary Examiner*—Lynda Jasmin
(74) *Attorney, Agent, or Firm*—R. Neil Sudol; Henry D. Coleman; William J. Sapone

(57) ABSTRACT

A method and a system including programmed general purpose digital computers on a computer network for effectuating the real-time trading of a commodity including, but not limited to, a currency. A commodity trading method implemented at a client or trader computer connected to a computer network (e.g., the Internet) includes (a) receiving, in encoded form via a computer network, a plurality of bids and a plurality of offers pertaining to a common commodity, (b) displaying the bids and offers on a computer monitor, (c) generating a trading offer including a trading rate or price per unit of the commodity and a number of units of the commodity, (d) automatically calculating a total stop amount for the trading offer, (e) automatically or electronically comparing the total stop amount with an amount in a client or trader account, and (f) transmitting a digital signal encoding the trading offer to multiple other clients via the computer network upon and only upon a determination that the total stop amount is less than an amount in the client account.

24 Claims, 12 Drawing Sheets

REAL-TIME COMMODITY TRADING METHOD AND APPARATUS

BACKGROUND OF THE INVENTION

The present invention relates to a real-time trading method. The present invention also relates to an associated apparatus for implementing the method. More specifically, the present invention relates to a method and apparatus for trading a commodity such as a currency in real time over a computer network such as the Internet.

In contrast to the stock market, where exchanges supervise and maintain an orderly and generally fair process of trading for all investors, the trading of currencies has no central exchange. Instead, a plethora of financial institutions trade currencies on behalf of their clients. There is only a modicum of governmental monitoring of the currency trading activities of these institutions.

In part because of the absence of substantial governmental regulation, currency trading is subject to well known abuse by the institutions acting as currency brokers. These institutions frequently misrepresent the spread between the highest bids (offers to buys) and the lowest offers (offers to sell). Where a client desires to consummate a currency exchange, the currency broker not only makes money on the revealed commission on the reported spread but also pockets the hidden spread, i.e., the difference between the actual spread and the spread reported to the client by the broker.

OBJECTS OF THE INVENTION

An object of the present invention is to provide a method and/or computer system for facilitating the trading of a commodity.

It is a more particular object of the present invention to provide a commodity trading method and/or system which enables the trading of a commodity such as a currency in real time.

Another particular object of the present invention is to provide such a method and/or system wherein the individual trader is provided with accurate information, for example, as to outstanding bids and offers on the commodity.

A further, specific object of the present invention is to provide such a method and/or system which enables the trading of commodities by virtually anyone, with anonymity.

An additional object of the present invention is to provide such a method and/or system which provides fast, secure, accurate pricing and fair prompt executions for all traders without bias.

Yet a further object of the present invention is to provide such a method and/or system wherein prices displayed are the actual prices at which trading occurs.

It is another object of the present invention to provide such a method and/or system which is easy to use.

Another object of the present invention is to provide such a method and/or system which provides the individual trader with a substantial increase in leverage without introducing any significant risk to the facilitator of the trading process.

These and other objects of the present invention will be apparent from the drawings and descriptions herein.

SUMMARY OF THE INVENTION

The present invention is directed to a method and an apparatus for enabling the trading of a commodity in real time. More particularly the present invention is directed to a computer implemented method and a system including programmed general purpose digital computers on a computer network for effectuating the real-time trading of a commodity including, but not limited to, a currency.

A commodity trading method implemented at a client or trader computer connected to a computer network (e.g., the Internet) comprises, in accordance with the present invention, (a) receiving, in encoded form via a computer network, a plurality of bids and a plurality of offers pertaining to the same or common commodity, (b) displaying the bids and offers on a computer monitor, (c) generating a trading offer including a trading rate or price per unit of the commodity and a number of units of the commodity, (d) automatically calculating a total stop amount for the trading offer, (e) automatically or electronically comparing the total stop amount with an available amount in a client or trader account, and (f) transmitting a digital signal encoding the trading offer over said computer network for distribution to multiple traders. (See definitions of "commodity," "trading offer," and "total stop amount" below.)

The total stop amount may include a base stop amount and a slippage amount for compensating delays in trading owing to the inevitable vagaries in the market. The slippage amount may be calculated by automatically multiplying a default slip per unit of the commodity times the identified number of units of the commodity in the trading offer.

The method may further comprise automatically allocating or reserving the total stop amount from the available amount in the client or trader account. The allocated or reserved amount may be deallocated or returned to an available status upon cancellation, execution or partial execution of the trading offer (or another trading offer of the same commodity). The method thus contemplates canceling at least a portion of the trading offer and automatically returning at least a portion of the allocated or reserved amount to the client or trader account upon such cancellation.

In accordance with a feature of the present invention, the digital signal is transmitted upon and only upon a determination that the total stop amount is less than the available amount in the client or trader account.

The comparing of the total stop amount with the available amount in the client or trader account is preferably, but not necessarily, performed by a client or trader computer connected to the computer network.

The calculating of the total stop amount may include automatically multiplying a default stop per unit of the commodity times the identified number of units of the commodity in the trading offer. Alternatively, where the trading offer additionally includes identification of a stop amount per unit of the commodity, the calculating of the total stop amount includes automatically multiplying the stop amount per unit of the commodity times the identified number of units of the commodity in the trading offer.

In accordance with further features of the present invention, the method further comprises displaying on the monitor a prompt (e.g., a text field) for entry of a stop value, a prompt (e.g., a text field) for a limit value and a prompt (e.g., a text field) for a time period during which the offer remains open. Upon determining that a respective stop value, limit value, or offer-open period has been selected for the trading offer, the respective stop value, limit value or time period is forwarded to the server computer together with the trading offer. However, the selected time period is more preferably not communicated to the server computer. Instead, the time period is tracked by the client computer, which automatically terminates the trading offer upon lapse of the time period, provided that the trading offer has not been executed in the interim.

In a commodity trading method in accordance with the present invention implemented at a client or trader computer connected to a computer network (e.g., the Internet), at least one digital signal encoding one or more bids and/or one or more offers pertaining to a common commodity is received via a computer network. The bids are displayed in a first monotonic sequence on a computer monitor, while the offers are simultaneously in a second monotonic sequence on the computer monitor. A computer input device such as a keyboard or mouse is monitored for a signal of a predetermined type. Upon receipt of such a signal, an order signal is transmitted over the computer network to a server computer. This order signal is treated by the system as a trading offer, the execution of which is conditional. If there are no prior arriving competing trading offers, then the order signal is executed.

In the method at the client or trader end, the method further comprises steps of (a) displaying on the monitor a plurality of prompts for particulars of a trading offer, the prompts including prompt to enter a price per unit of the commodity and a total number of units of the commodity, (b) determining entry via the input device of a trading offer including at least a price per commodity unit and a total number of commodity units, and (c) forwarding the trading offer to a server computer over the computer network for relay to other traders on the computer network.

Where the prompts include one for entry of a stop value and the client or trader computer determines that the trading offer includes a respective stop value, the forwarding the trading offer includes transmission of the respective stop value to the server computer. The server computer generally only stores the stop value as a part of the trading offer, unless the respective trading order results in a transaction, i.e., an executed order. In that case, the server computer generates an entry in a stop bid queue or a stop offer queue, as appropriate, for possible execution depending on the market conditions. The queue entry may include the stop value and an appropriate number of commodity units in a stop queue. In addition, the server computer may publish or distribute the stop bids and stop offers to various trading participants, particularly market makers, over the computer network. In that case, the trading participants may themselves attempt execution on the stop bids and stop offers by making trading offers at the respective listed prices.

Where an order is executed by the server computer, the positions of the trading parties are calculated, or recalculated if the individual trading parties already have positions owing to prior trades. Sometimes a trade or transaction will modify the position of a trader having an outstanding stop so that the stop is changed from one kind (e.g., a stop bid) to the other (e.g., a stop offer). At other times, the position of the individual trader will return to zero so that the trader no longer has a stop bid or stop offer.

Where the prompts on the trading screen include one for entry of a limit value and the client or trader computer determines that the trading offer includes a respective limit value, the forwarding the trading offer includes transmission of the respective limit value to the server computer.

The prompts displayed on the monitor of the client or trader computer may include a prompt for entry of a time period for which the trading offer remains valid and capable of being accepted. In that case, the client computer operates to determine whether each entered trading offer includes a respective time period. If so, the client computer tracks the time period and terminates the trading offer at the end of the time period, provided that the trading offer has not already been fully executed.

Generally, it is contemplated that the particular trading operations executed by the client or trader computer are controlled by a program downloaded over the computer network. In particular, the program enables and controls the displaying of the bids and the offers on the computer monitor in response to one or more digital signals arriving over the computer network. Such downloading may occur from a Web site independent of the server computer. Alternatively, the trading program may be loaded from a CD ROM drive or a floppy drive.

The client or trader computer is a general purpose digital computer with a monitor and a command input device (keyboard, mouse, etc.). This general purpose digital computer is modified by programming to comprise (i) a register storing a plurality of bids and a plurality of offers pertaining to trading of the same or common commodity, (ii) an update module operatively tied to the register for updating contents thereof, (iii) a communication component operatively connected to a computer network and to the update module for receiving, from the computer network, data to be temporarily stored in the register and for providing the data to the update module, (iv) a display control operatively connected to the register for displaying the bids and the offers in a predetermined format on the monitor, (v) a command recognition circuit operatively connected to the command input device for receiving a trading offer from same, the command recognition circuit being operatively linked to the display control, whereby the trading offer displayed in a visually detectible form on the monitor, and (vi) command relay or formatting circuitry operatively connected to the command recognition circuit and to the computer network, whereby the trading offer is transmitted over the computer network to a server computer.

In accordance with a feature of the present invention, the client or trader computer further comprises a stop computation circuit, operatively connected to the command recognition circuit, for automatically computing a total stop amount for the trading offer, a memory storing an available amount in a client account of the client, comparison circuitry operatively connected to the stop computation circuit and the memory for comparing the total stop amount with the available amount in the client account, the command relay circuitry being operatively connected to the comparison circuitry for acting on the trading offer upon detection that the total stop amount and the available amount in the client account conform to pre-established criteria. In particular, the command relay circuitry is programmed to transmit the trading offer over the computer network to the server computer only upon detecting that the total stop amount is less than or equal to the available amount in the memory.

In the event that the pre-established criteria are met, for example, in the event that the total stop amount is less than the available amount in the client account, the client or trader computer allocates or segregates the calculated total stop amount from the available amount in the client account.

The stop computation circuit may include a second or additional register storing a default stop per unit of the commodity and a multiplier connected to the additional register and to the command recognition circuit for multiplying the identified number of units of the commodity in the trading offer by the default stop stored in the additional register. It is generally contemplated that the default stop includes a base default stop value and a default slippage value. The total stop amount thus includes a base stop amount and a slippage amount. Where the trading offer additionally includes identification of a stop amount per unit of the commodity, the stop computation circuit includes a multiplier operatively connected to the interface for automatically multiplying the stop amount per unit of the commodity times the identified number of units of the commodity in the trading offer.

The first register of the client or trader computer may be a portion of the general memory of the computer which has been segregated or reserved for purposes of storing the bids and offers as they arrive over the computer network. The update module includes circuits programmed to recognize that an incoming signal encodes bids and offers and to store this data in the register. The communication component receives and decodes incoming signals and also encodes and transmits outgoing signals received, for instance, from the command relay or formatting circuitry. Similarly, the second register of the client or trader computer may be a portion of the general memory of the computer which has been segregated or reserved for purposes of storing a default stop value.

In accordance with another feature of the present invention, the display control includes a memory storing the format for the display. A programmer unit in the client or trader computer is operatively coupled to the computer network and the display control for downloading, from the server computer, a program containing the display format and for storing the display format in the memory upon downloading of the program from the server computer via the computer network. It is to be noted that the display format program, indeed the entire trading program, may be alternatively downloaded from an independent source, such as a Web server, over the Internet or may be loaded from a floppy disc or CD ROM.

As discussed above, the display format may include prompts for entry of a stop value, a limit value and a time period for validity of the trading offer. The command relay circuitry forwards an entered stop value and/or the calculated total stop amount or an entered limit value to the server computer with the trading offer. As discussed above, a selected time period triggers tracking thereof by the client computer to determine when the trading offer is to be withdrawn.

The client or trader computer may have a third register or memory area storing position data for the individual client or trader. The position data includes a commodity amount, a price per unit of the commodity, and a profit or loss value if the current position is closed at prevailing market rate. The display format includes an area for listing the position data on the monitor.

Pursuant to an additional feature of the present invention, the client or trader computer further comprises arithmetic circuitry operatively connected to the communication component and to the second register for calculating, in response to a consummated transaction, a new position amount and an average price per unit and providing the calculated position amount and the calculated average price to the second register. Thus, where the position of the client or trader is initially long (or short) and is modified by selling or additional buying (or buying or additional selling) without closure of the position, the average price per unit of the commodity will be determined by the arithmetic circuitry and displayed on the computer monitor of the trader.

In accordance with a specific feature of the present invention, the display format includes a first window or display area and a second window or display area disposed side by side on the monitor by the display control, the first display area listing the bids in a first monotonic order, the second display area listing the offers in a second monotonic order. This format facilitates comparison of the bids and offers, their amounts, spreads, open periods, etc. These display areas may also display stop bids and stop offers in respective monotonic orders, where the server computer is programmed to broadcast or distribute such information to participating traders. Of course, the display of stop bids and stop offers permits selected trader participants, especially market makers, to trade on the stops.

The server computer is likewise a general purpose digital computer modified by programming to comprise an interface receiving a first digital signal over the computer network from a client's computer, the first digital signal encoding a trading offer including identification of a commodity, a trading rate or price, and a number of units of the commodity. Like the client or trader computer, the server computer may further comprise a stop computation circuit operatively connected to the interface for automatically computing a total stop amount for the trading offer, a memory storing an amount in a client account available for trading, and comparison circuitry operatively connected to the stop computation circuit and the memory for comparing the total stop amount with the available amount in the client account. A posting module is operatively connected to the interface and the comparison circuitry for transmitting selected details of the trading offer to multiple other clients via the computer network upon receiving a signal from the comparison circuitry that the total stop amount is less than the amount in the client account.

In a preferred embodiment of the invention, instead of calculating a total stop amount prior to posting of a trading offer via the computer network, the server computer waits until it detects a match between a bid and an offer. Prior to that time, the server computer merely stores the stop value associated with the trading offer. As part of the order execution process carried out upon the detection of a match between a bid and an offer, the server computer determines the positions of the traders who made the matching bid and offer. This determination entails in part a calculation of composite stops for the traders. These composite stops are determined by the trading histories of the individual traders including stops associated with the bid and the offer of the immediate realized transaction.

In accordance with another feature of the present invention, the server computer comprises a queue maintenance unit operatively tied to the interface for supervising a queue of trading offers. The trading offers are ordered or listed by price per commodity unit and may be additionally ordered by times of extending of the respective trading offers, at least where two or more trading offers have the same price per commodity unit. These orderings facilitate the server computer's supervision of trading offers and appropriate and timely execution of trading orders.

Where the queue more particularly includes a list of bids and a list of offers to sell, the server computer may further comprise a comparator operatively connected to the queue maintenance unit for periodically comparing the bids with the offers to determine whether a match has occurred and an order execution module operatively coupled to the comparator for (a) modifying accounts of traders who made a matching bid and offer to sell, (b) removing the matching bid and offer to sell from the list of bids and the list of offers to sell, (c) transmitting signals over the computer network to advise all logged-in traders of the match, upon detection by the comparator of the match, and (d) sending specific confirmation to the traders who made the matching bid and offer to sell.

The server computer generally comprises an administration module operatively linked to the interface for logging in traders as log-in requests arrive and a message distribution module for supervising the establishment of multiple private chat forums, and distributing messages among logged-in traders according to established chat forums.

A client or user computer is thus operatively connected to a computer network for implementing a commodity trading system, the client or user computer being programmed to display on a computer monitor a list of a plurality of bids received by the client or user computer from different trading computers connected to the computer network and a list of a plurality of offers received by the client or user computer from different trading computers connected to the network, the client or user computer being further programmed to recognize a user command to place a trading offer at a transaction rate of one of the bids and the offers or better, the client or user computer being additionally programmed to transmit over the computer network a digital signal encoding the trading offer.

A method for use in trading a commodity comprises (1) generating a trading offer, (2) automatically calculating a total stop amount for the trading offer, (3) automatically comparing the total stop amount with an available amount in a client or trader account to determine whether the total stop amount and the available amount meet pre-established criteria, and (4) acting on the trading offer only upon determining that the total stop amount and the available amount meet the pre-established criteria.

Pursuant to another feature of the present invention, calculating the total stop amount includes computing a stop amount and a slippage amount. The calculating of the slippage amount may be implemented by automatically multiplying a default slip per unit of the commodity times the identified number of units of the commodity in the trading offer. Where the trader identifies a stop value of stop per commodity unit, the slip value may be added to the stop value automatically prior to calculating a total stop amount.

Preferably, the total stop amount is automatically allocated or reserved from the available amount. Where all or part of the trading offer is canceled, at least a portion of the allocated or reserved amount is automatically returned to the client or trader account.

It is contemplated that acting on the trading offer includes transmitting a digital signal encoding the trading offer to over the computer network for distribution to multiple traders. Preferably, the digital signal is transmitted upon and only upon a determination that the total stop amount is less than an available amount in the client or trader account. It is also contemplated that the generating of the trading offer and the comparing of the total stop amount are both performed by a client or trader computer connected to the network.

Another feature of the present invention is directed to the monitoring and execution of stop orders. A server computer undertaking these actions is connected to a computer network for implementing an on-line commodities trading system and comprises a queue maintenance unit for maintaining a queue of bids, a queue of offers, a queue of stop bids, and a queue of stop offers. The server computer further comprises a comparator operatively connected to the queue maintenance unit for determining whether a match between a bid and an offer has occurred, and an order execution module operatively coupled to the comparator and the queue maintenance unit in part for modifying at least one of the queue of bids and the queue of offers upon a determination by the comparator that a match has occurred. A monitoring module is operatively connected to the comparator and the queue maintenance unit for monitoring the stop bids and the stop offers in relation to the match to determine whether any of the stop bids and the stop offers should be executed. A stop execution module is operatively coupled to the monitoring module and to the queue maintenance unit for executing one of the stop bids and the stop offers and modifying a respective one of the queue of stop bids and the queue of stop offers upon execution of the one of the stop bids and the stop orders.

Pursuant to a particular feature of the present invention, the order execution module includes means for (a) modifying accounts of traders who made a matching bid and offer to sell, (b) removing the matching bid and offer to sell from the queue of bids and the queue of offers to sell, (c) transmitting signals over the computer network to advise all logged-in traders of the match, upon detection by the comparator of the match, and (d) sending specific confirmation to the traders who made the matching bid and offer to sell.

Pursuant to another particular feature of the present invention, the server computer further comprises a position determination module operatively connected to the order execution module for computing, upon detection by the comparator of the matching bid and order to sell, positions of the traders who made the matching bid and offer to sell and further computing stops associated with the computed positions. The position determination module is operatively connected to the queue maintenance module for updating the queue of stop bids and the queue of stop offers to incorporate the computed stops.

Pursuant to yet another feature of the present invention, the server computer additionally comprises a communications module operatively connected to the queue maintenance unit for broadcasting the queue of bids, the queue of offers, the queue of stop bids, and the queue of stop offers over the computer network to computers of participating traders.

A method and an associated apparatus in accordance with the present invention enable the real time trading of commodities by virtually anyone, with anonymity. The invention provides fast, secure, accurate pricing and fair prompt executions for all traders without bias. The prices displayed are the actual prices at which trading occurs.

A method and an apparatus in accordance with the present invention facilitates the trading process. For example, market news and information may be provided on the same computer monitor or display screen on which trading prices are displayed. Further information access is facilitated by providing a computer chat service, coupled with the trading book.

For currency market makers, dealers and traders, the present invention offers heretofore unknown opportunities. Market makers can enjoy the benefit of an increased client base without additional marketing costs and time-consuming customer service calls. Dealers are provided with additional outlets to trade out of positions and the ability make markets when desired. Dealers are not required to make two sided prices—thereby reducing their risk. Traders can execute against the prices of not one but multiple market makers—the traditional middleman being eliminated, thus creating a market more efficient than any other commodities trading market.

Another advantage provided to market makers is the possibility of stop competition. Participants are able to trade against stop bids and stop offers and more particularly against stop bids and stop offers of all participating traders.

In contrast to traditional currency trading practice, the present invention enables a trader to trade at his or her price, not at a price arbitrarily set by a middleman. The trader is thus able to trade between traditional spreads, avoiding "leaning" and other practices that are commonly used against the trader's orders in conventional trading procedures. Market orders are executed at the best price available without human intervention.

The present commodity trading system and method provide a substantial increase in leverage relative to existing commodity trading techniques. This increase in leverage does not come at the expense of the facilitator or the operator of the trading system. Because of automatic stop monitoring and automatic stop execution, the facilitator or operator is naturally protected. Automatic or machine-mediated stop monitoring results in a more efficient market.

The facilitator or operator of the commodity trading system has several options for making a profit on the trading activities. Preferably, a percentage or flat-rate commission is collected from the buyer and/or seller.

The present invention provides a commodities trading system which is easy to use. Simple instructions and the end-user or trader software are downloaded by a potential user. The user or trader completes an application, optionally transmitted over the Internet to the system server. After approval of the application, the user deposits funds in a selected financial institution or with a selected company for purposes of covering trades over the commodities trading network of the instant invention. At that juncture, the user can trade over the Internet, whether in the privacy and comfort of the home or office, or anywhere a computer (laptop) connection to the Internet is available. The screen design and menu choices are user friendly.

Definitions

Figure 1:
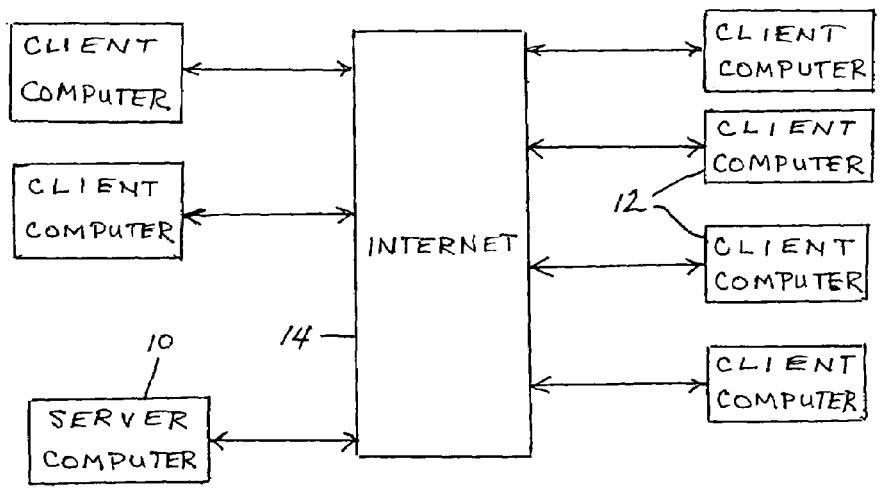
FIG. 1 is a block diagram of a global computer network or system used for a real-time trading of a commodity, in accordance with the present invention.

As used herein, the term "trading offer" means an offer to buy (bid) a commodity or an offer to sell (offer) the commodity. A trading offer includes an identification of the target commodity, which, in a currency trading network, is a currency denomination. This identification may be communicated by context of a trading offer. A trading offer further includes a trading rate or price, which specifies the per-unit amount at which the trader placing the order is willing to buy or sell the commodity.

As used herein, the term "trading order" denotes a trading offer which includes a price matching an extant trading offer of the opposite type. Generally, the individual trader making the trading order is aware, through the trading system of the present invention, of the pre-existing trading offer which he or she would like to accept. A trading order leads to or incorporates a transaction, provided that another trading order has not previously arrived at the server computer. The prior order would take precedence and preempt the second order. For this reason, it is not strictly possible for any individual trader participant to accept an extant trading offer. Thus, a trader participant's trading order is technically a bid (offer to buy) or offer (offer to sell) at a price of a pre-existing offer or bid.

The term "command input device" is used herein to denote a keyboard, a mouse, or other piece of hardware which mediates entry of commands and data into a computer.

The term "commodity" is used herein to designate any tradable item, i.e., anything which is quantifiable in discrete units of measure to which a price may be attached. Thus, commodities include such things as grains, oil, metals, computer memory chips, baseball cards, paintings, used cars, currencies, and financial instruments.

The term "stop value" as used herein signifies a net number of points per commodity unit representing the difference between the price of a trade and the price of the stop to be created for that trade.

The term "total stop amount" as used herein is intended to signify a monetary amount required to cover a stop execution on a trading offer. The total stop amount includes a primary quantity equal to a stop value (usually a small fraction of a unit price) multiplied by the number of units of the commodity in the trading offer. The total stop amount also includes a slippage portion intended to cover a projected possible additional amount arising from a delay in a trade occasioned in part by trading volume and the rate of change in the price of the commodity.

The term "available amount" as used with reference to a client or trader account means that portion of the client or trader account which may be used in covering trading offers and executed trades of the respective client or trader. The available amount is usually, if not always, less that the total amount in the account. An unavailable portion of the account is segregated for security or safety reasons.

The word "automatic" or "automatically" is used herein to denote an operation or action undertaken by machine in response to an input where there is no human intervention between the occurrence of the input and the operation or action. More specifically, the word "automatic" or "automatically" is used herein to denote such an operation or action implemented by electronic means without an immediate or direct human action or operation.

The term "monotonic order" as used herein means a sequence of numerical values which increase (or remain the same) or decrease (or remain the same) from one numerical value to the next throughout the entire sequence or listing of the numerical values. In other words, when taken only in one direction through a monotonically ordered list, each numerical value in the list is greater than or equal to the immediately preceding numerical value. In the opposite direction, each numerical value is less than or equal to the immediately preceding numerical value.

The phrase "removing a matching bid and offer to sell" and grammatically related phraseology are intended to cover both complete and partial deletion of the matching bid and offer from the trading system. Partial deletion or a bid or offer occurs when there is a mismatch in the number of commodity units in the matching bid and offer. The prices match, but the number of commodity units do not match so that one of the bid or offer becomes modified to have the same price per commodity unit but a smaller maximum number of commodity units.

The term "prompt" as used herein is an indication on a computer screen or display of a point on the screen at which a command, order, or data is entered by keyboard or mouse or other input device. A prompt may take the form of a text field or a drop-down list.

The word "format" as used herein means in part a scheme for ordering different pieces of information on a computer screen or display. A menu, a window-type display, an order for a list of data items, are all examples of a format.

DESCRIPTION OF THE PREFERRED EMBODIMENTS

FIG. 1 illustrates a global computer network for realizing a real time trading of a commodity such as a currency. A server computer 10 is connected to a plurality of client or trader computers 12 via the Internet 14. The server computer 10 mediates, supervises and controls the transmission of trading information, as well as offers and orders to purchase and sell the target commodity.

It is contemplated that client computers 12 operate under the control of trading software downloaded from an independent Web site (not illustrated) via the Internet 14. Upon completion of an application by a prospective client or trader, the communication of that application, and the acceptance of the application in accordance with standards of a kind well known to those in the industry, the trading software is provided to the respective client or trader computer 12. In part to reduce the workload of server computer 10, the trading software is downloaded from the Web site via the Internet 14 or loaded from floppy disks or CD ROM. If the processing capacity of server computer 10 is sufficient, however, there is no reason why the trading software could not be downloaded from the server.

Figure 2:
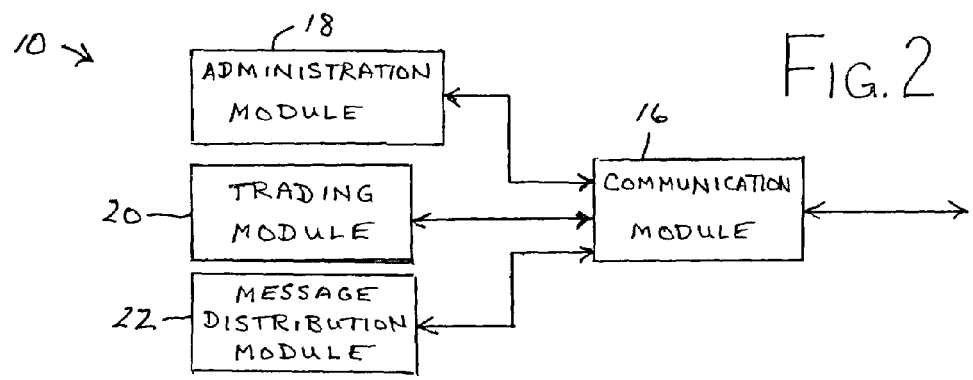
FIG. 2 is a block diagram of selected functional modules of a server computer shown in FIG. 1.

As illustrated in FIG. 2, server computer 10 is configured by its own software to have four principal modules, namely, a communication module 16, an administration module 18, a trading module 20, and a message distribution and generation module 22. Communication module 16 broadcasts or transmits and receives trading information via Internet 14. In addition, communication module 16 decodes or decrypts incoming digital signals and digitized messages and encodes or encrypts outgoing signals or messages. The signals encode, in part, trading offers and trading orders. Messages contemplate ancillary information such as chat-type communications ancillary to the trading process.

Administration module 18 controls routine daily processes such as processing log-in and log-off requests from clients or traders, initialization of trading at the beginning of a trading day and the termination of trading at the end of the day.

Trading module 20 keeps track of all incoming bids (offers to buy) and offers (offers to sell) relating to each tradable commodity of a predetermined kind. In particular, trading module 20 tracks all bids and offers pertaining to all tradable currencies. Trading module 20 also determines whether there are any matches between the bids and offers pertaining to the respective trading currencies. In the case of a match, trading module 20 takes steps to complete the respective transaction, i.e., execute the trading order. Furthermore, trading module 20 maintains queues of stop bids and stop offers and executes on those stops as market conditions require. Optionally, server computer 10 broadcasts the stop bid and stop offer queues to participating traders (e.g., market makers) and executes on trading offers made on the stop bids and stop offers. Stop validation and execution entails a continuous tracking of the positions and accounts all traders. In the event a stop execution is necessary, trading module 20 adjusts the respective trader's position and the trader's account. This adjustment may, for example, entail a change in a stop listed for that trader.

Message distribution module 22 maintains lists of all private and public chat groups and appropriately distributes incoming messages intended for the members of the different chat groups.

It is to be noted that the different functions of server computer 10 may be distributed among a plurality of parallel server computers. In a simple division of labor, one such computer is dedicated to the administrative functions of module 18, while another computer performs all of the trading operations of trading module 20 and a third computer undertakes message distribution and generation (module 22). Similarly, the functions of any one module of FIG. 2 may be executed by a plurality of parallel server computers. For example, the trading function may be performed for different commodities (e.g., different currencies) by different server computers.

Figure 3:
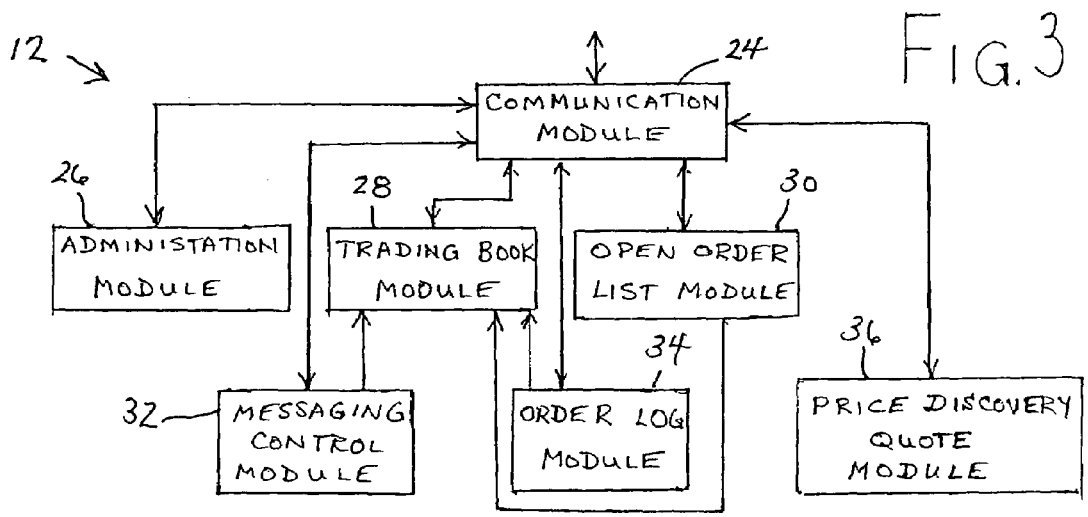
FIG. 3 is a block diagram showing selected functional modules of a client or trader computer illustrated in FIG. 1.

As illustrated in FIG. 3, each client or trader computer 12 is configured by the downloaded trading software to have several principal modules including a communication module 24, an administration module 26, a "trading book" module 28, an open order list module 30, a messaging control module 32, an order log module 34, and a "price discovering quote" module 36.

Communication module 24 transmits and receives trading information via Internet 14. This trading information includes bids and offers made by other traders logged in to server 10. The bids and offers each include an identification of the relevant currency, as well as a trading rate or price and preferably a time period during which the respective bid or offer is to remain open. Communication module 24 decodes or decrypts incoming digital signals containing trading information and encodes or encrypts outgoing signals containing trading information including trading offers and trading orders placed by the respective trader. Chat messages are also handled by communication module 24.

Administration module 26 cooperates with administration module 18 of server computer 10 to enable logging in and logging off of the respective trader. In addition, administration module 26 participates in setting up and monitoring an account of the individual trader. It is to be noted that, in practice, part of a client's account is held as a security deposit and is not made available for covering the respective trader's position. Another part of the client's account is dynamically tradable, i.e., is utilizable to cover forced trades (stops) of all or part of the client's position. The portion of the client's account available for trading may be a predetermined percentage of the total account, such as 50% or 75%, or a monetary figure. Of the tradable portion of the client's account, a first portion is segregated to cover any stop execution that may be required on the client's trading position while a second portion may be allocated or reserved to cover one or more outstanding bids or offers of the client.

As discussed in detail hereinafter, "trading book" module 28 displays all incoming bids and offers pertinent to each tradable commodity selected by the respective trader. These incoming bids and offers are displayed by trading book module 28 on a computer monitor, as discussed hereinafter with reference to FIG. 4. Trading book module 28 also receives, processes and relays to server computer 10 trading offers and orders submitted by the respective trader, as discussed in greater detail below. Trading offers may include stop values set by the particular traders. Accordingly, trading book module 28 also undertakes credit calculation and mediates stop and limit setting. More specifically, trading book module 28 validates stops by computing a total stop amount and checking that amount against the balance in a cash account of the particular trader generally maintained with the operator of server computer 10. In addition, server computer may allocate funds in the client or trader's account to cover trading offers and executed orders of the individual trader.

Open order list module 30 tracks the individual trader's position and cooperates with trading book module 28 in displaying the particulars of the trader's position on the computer monitor. Open order list module 30 may also cooperate with server computer 10 in tracking the individual trader's position.

Messaging control module 32 maintains lists of all private chat groups and appropriately distributes incoming messages intended for the members of the different chat groups.

Order log module 34 maintains a record of all of the transactions during a predetermined period, such as a trading day. Order log module may cooperate with server computer 10 to obtain and display the trading history of the individual trader for earlier periods upon request by the trader.

"Price discovery quote" module 36 displays a price quote process.

Figure 4:
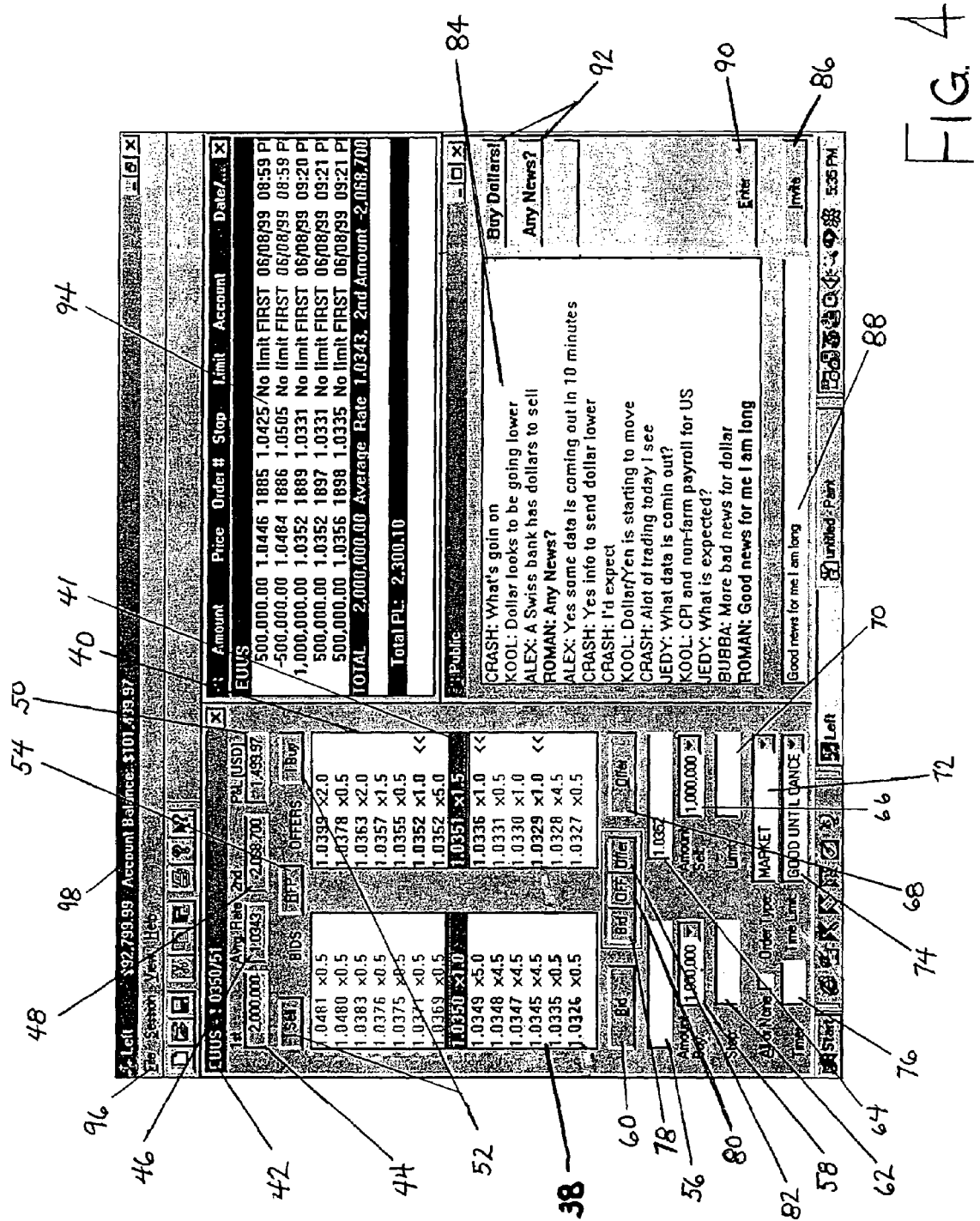
FIG. 4 is a diagram of a display screen provided on a monitor of the client computer shown in FIG. 3.

FIG. 4 illustrates a trading window or screen displayed on a monitor of client or trader computer 12 where the individual trader is trading in the European currency, the Euro. On the left side, the trading screen includes a pair of vertically oriented rectangular areas 38 and 40 disposed adjacent to one another and respectively displaying a list of bids and a list of offers each of which monotonically increases from the bottom to the top of the respective list. The bids and offers are identified by their respective rates or prices, i.e., at the number of U.S. dollars to buy one Euro. Also included in the illustrated lists are total numbers of currency units available for trading at the listed prices of the respective bids and offers. The value "×4.5" indicates a bid or offer to trade up to 4.5 million yen at a respective exchange rate or price. At highlighted centers 41 of rectangles 38 and 40 are the current best bid and the current best offer for the currency being traded. In this case, the best bid is at a trading rate or price of 1.0350 Dollars to the Euro, while the best offer is at a trading rate or price of 1.0351 Dollars to the Euro. The rates of the current best bid and the current best offer are also indicated at 42 on the display screen.

The bids displayed in rectangle 38 above the highlighted current best bid of 1.0350 are stop bids. Similarly, the offers located in rectangle 40 below the highlighted current best offer of 1.0351 are stop offers. These stop bids and stop offers are provided to market makers and optionally to other participating traders. Usually, traders who are not market makers are provided only with their own stop bids and stop offers, not those of other traders.

The trading screen of FIG. 4 includes a line of four windows 44, 46, 48, 50 wherein the current position of the individual trader is delineated. Trading book module 28 (FIG. 3) calculates in real time the open aggregate position of the individual trader and the profit or loss incurred should the individual trader close his or her position at the best bid or offer currently available. The total value (2,000,000) of the target currency (in this case, the Euro) and the total value (−2,068,700) of the Dollar in the individual trader's current position are listed in the first window 44 and the third window 48, respectively, while the average rate or price (1.0343) at which the individual trader arrived at that position is indicated in the second window 46. The fourth window 50 sets forth the profit or loss (1,499.97) that would be incurred should the individual trader close his or her position at the best bid or offer currently available.

The screen of FIG. 4 also includes a pair of "buttons" 52 by which the individual trader can take the best bid or offer currently available. A click or actuation of a mouse on one of the buttons 52 submits a bid or offer by the individual trader to buy or sell at market and results in the immediate transmission of a trading order to server computer 10 via the Internet 14 and particularly via communication modules 24 and 16.

At 54 is indicated a "button" the actuation of which results in generation of a message transmitted to all participants in the current trading of the target currency, in this case the Euro, indicating that the individual trader wishes to engage in trading of the Euro. Actuation of button 54 transmits a request for price quotes from on-line trading participants.

Generally, the display, monitoring and control of rectangles 38 and 40, indicator 42, windows 44, 46, 48, 50, and buttons 52 and 54 are executed by trading book module 28. Further discussion of components of module 28 to effectuate this display, monitoring and control may be found below.

Reference numerals 56 and 58 designate prompts used by the individual trader to make an offer to buy (bid) the currency or other commodity of interest. Prompt 56 takes the form of a text field indicating a trading rate or price for the currency of interest. Upon a mouse click in text field 56 and an entry of a numerical value, that value appears in text field 56 as a trading rate or price. Prompt 58 takes the form of a drop-down list displaying a number of units of the target currency selected by the trader for possible purchase. Upon entry of a numerical value in text field 56 and a selection from drop-down list 58, the individual trader mouse-clicks on a button 60 to trigger a forwarding of the bid to other currently on-line traders.

The individual trader has the option of setting a stop value in a bid or offer. A text field 62 is provided to prompt the trader to enter a stop value prior to a clicking on button 60. An entered stop value may be forwarded as part of a bid or offer to server 10 for distribution to participating clients or traders.

Reference numerals 64 and 66 designate text-field and drop-down-list prompts used by the individual trader to make an offer to sell (offer) the currency or other commodity of interest. Text field 64 prompts the individual trader to enter a trading rate or price and indicates a selected trading rate or price for the currency of interest. Upon a mouse click in text field 64 and an entry of a numerical value, that value appears in text field 64 as a trading rate or price. Drop-down list 66 prompts the individual trader to enter a number of units of the currency for possible sale and displays a selected number. Upon entry of a numerical value in text field 64 and a selection from a list of numerical values in drop-down list 66, the individual trader mouse-clicks on a button 68 to trigger a forwarding of the offer to other currently on-line traders.

The individual trader has the option of including a limit value in a bid or offer. Window 70 is provided to prompt the trader to enter a limit value prior to a clicking on button 68. An entered limit value may be forwarded as part of a bid or offer to server 10 for distribution to participating clients or traders. A drop-down list 72 prompts the trader to select a type of order, whether market type, or having a limit.

Another drop-down list 74 and another text field 76 are provided for prompting the trader to specify temporal conditions of a proposed trade. Window 74 provides a menu or list of possible selections, while text field 76 is provided for the entry of a specific numerical value for a time period for which a bid or offer is to remain valid or open, i.e., capable of acceptance by another trader. Generally, all prices are static unless the timer is used to make them dynamic.

Generally, the display, monitoring and control of text field 56 and drop-down list 58, button 60, text fields 62 and 64, drop-down list 66, button 68, text field 70, drop-down lists 72 and 74, and text field 76, are executed by trading book module 28. Further discussion of components of module 30 to effectuate this display, monitoring and control may be found below.

Three "buttons" 78, 80, 82 are provided for enabling a trader to instantly remove his or her bid or offer from the trading network. Using a computer mouse to "click" on button 78 and then on button 80 causes an extant bid placed by the individual trader to be deleted from rectangles 38 on the computer screens of other logged-in traders. Similarly, "clicking" on button 82 and then on button 80 causes an existing offer placed by the individual trader to be deleted from rectangles 40 on the computer screens of other logged-in traders. These deletions are effectuated through server computer 10.

Another group of windows and prompts, in the lower right-hand quadrant of FIG. 4, pertains to a chat facility mediated or enabled particularly by messaging control module 32 of the various client or trader computers 12. A window 84 displays a series of messages in a universal chat forum including all traders logged-in to the system at the time or a private chat forum including only designated traders. A "button" 86 is provided for enabling the individual trader to initiate a private chat forum by extending an invitation to a group or a particular person or to investigate whether any private chat groups have extended an invitation to the individual trader. A menu screen (not shown) may be provided for prompting and facilitating the individual trader to engage in any of these options.

During a chat session viewable in window 84, the individual trader types in contributions to the chat session in a text field 88. Pressing the "enter" key on a computer keyboard or mouse clicking on a displayed "button" 90 causes the message in text field 88 to be transmitted to server computer 10 from whence the message is distributed by message distribution module 22 to the various other participants in the particular trader chat session. Upon distribution, the message is displayed in window 84 together with an identification or "screen" name of the trader originating the message.

A series of "buttons" or "keys" 92 are provided for allowing commonly used expressions to be entered by a single keystroke or mouse actuation. These expressions may be predefined by the trading program. Alternatively, the trading program may permit an individual trader to customize keys 92 (see circuit 234 in FIG. 11).

An upper right-hand quadrant of the computer screen or display includes a window 94 showing all orders made by the individual trader during the course of a trading day. A separate reporting module (not shown) may be provided for calling up from server computer 10 orders made by the individual trader on previous days. These functions are executed by open order list module 30 (FIG. 3).

Various options of the trading program are selectable by the individual trader through utilization of user-friendly menus (not shown) pulled down by mouse clicking on appropriate entries in a main menu 96. In addition, along a title bar of the trading program screen shown exemplarily in FIG. 4 is displayed account balances 98 of the individual trader in real time.

Chat window 84, and its ancillary window 88 and buttons 86, 90, and 92, and order log window 94 may be omitted from the trading program display in order to allow space for two or more currency trading windows identical in format to the left-hand side of FIG. 4. These multiple trading windows may be displayed side by side on the computer screen to enable simultaneous trading in two or more currencies. Thus, the individual trader would be presented with two or more bid rectangles 38 (including stop bid lists), two or more offer rectangles 40 (including stop offer lists), two or more position or each window 44, 46, 48, and 50, at least two of each prompt window 56, 58, 64, and 66, etc.

Figure 5:
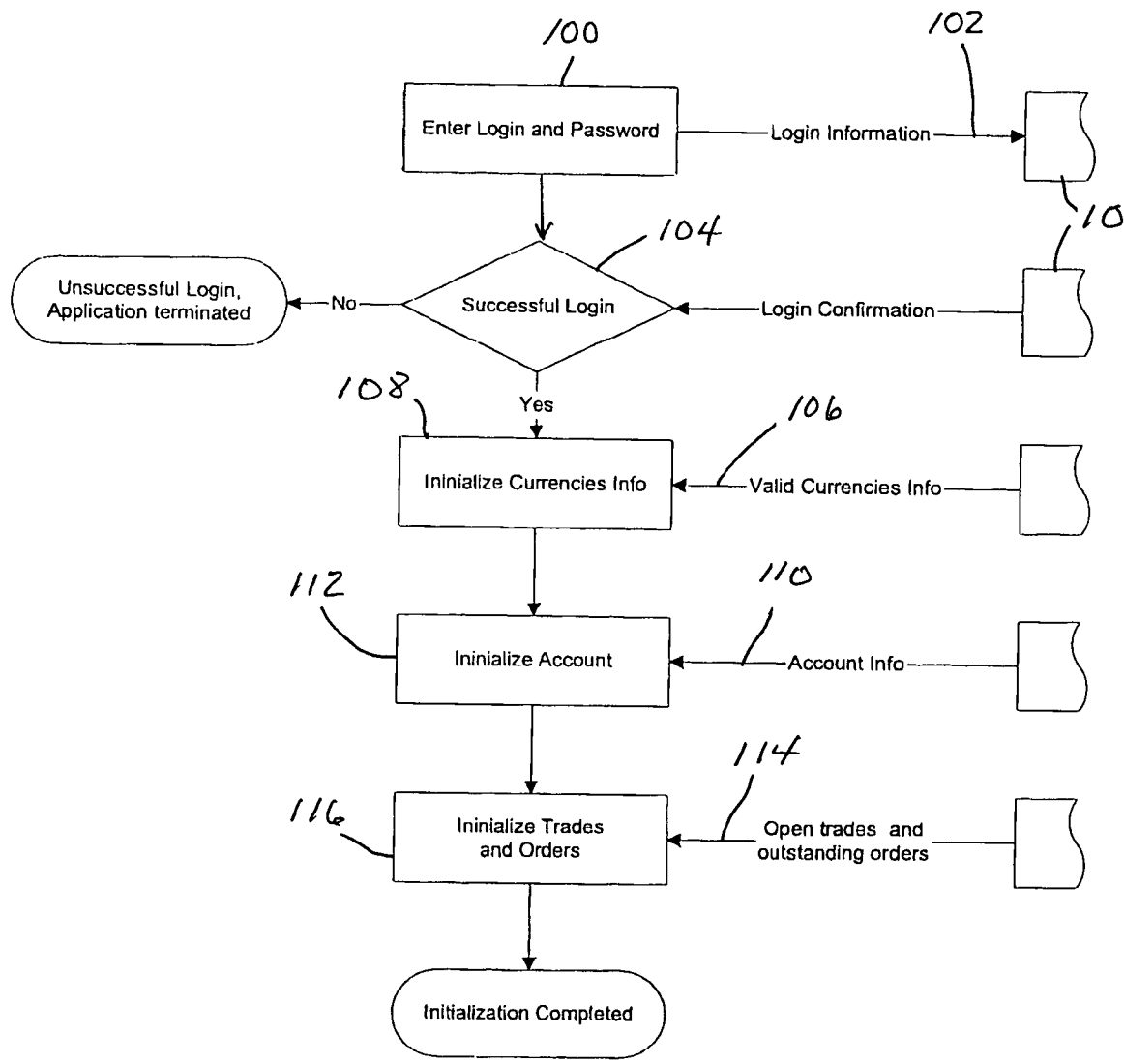
FIG. 5 is a flow chart diagram of a log-in process executed by a client or trader computer illustrated in FIGS. 1 and 3.

As illustrated in FIG. 5, client computer 12 and mainly administration module 26 thereof begins a trading session by obtaining a log-in and a password from the individual trader in a step 100 and transmitting that information, as indicated by an arrow 102, to server computer 10 and particularly administration module 18 thereof. Administration module 26 of the client computer 12 then waits for confirmation of the log-in from server computer 10. If no confirmation is received from server computer 10, as determined at a decision junction 104, the log-in process is terminated at 104. If confirmation is received from the server computer, that confirmation is accompanied by current currencies information, as indicated by an arrow 106. Client computer 12 uses that incoming information in a step 108, inter alia, to initialize currency data for listing on the display screen of FIG. 4. At log-in, server computer 10 also transmits account information to the respective client computer 12, as indicated by an arrow 110. The incoming account information is utilized by client computer 12 to initialize the account in a step 112. In addition, server computer 10 provides a newly logged-in customer or client with currently open trading offers and outstanding orders, as indicated by an arrow 114. Client computer 12, and particularly trading book module 28 (FIG. 3), displays those trading offers and orders in rectangles 38 and 40 (FIG. 4) in a step 116.

Figure 6:
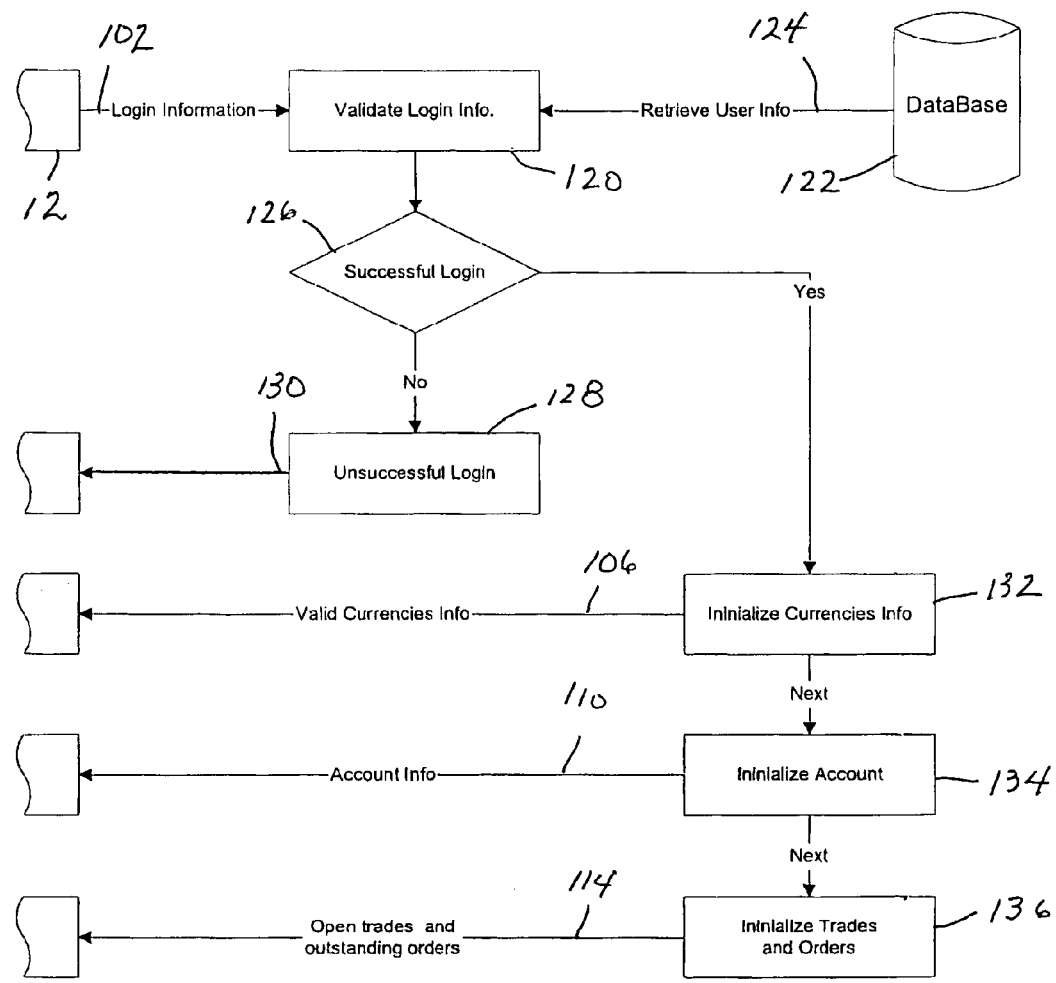
FIG. 6 is a flow chart diagram of selected administration routines executed by the server computer of FIG. 1 and more particularly by an administration module shown in FIG. 2.

FIG. 6 depicts action undertaken by administration module 18 (FIG. 2) of server computer 10 upon receiving log-in information from a client computer 12, as indicated by arrow 102. In a step 120, administration module 18 processes the log-in information. To that end, administration module 18 retrieves user or client information from a database 122, as indicated by an arrow 124. In a inquiry 126, administration module 18 checks whether the log-in information is accurate and valid. If not, administration module 18 generates an unsuccessful long-in report at 128 and transmits the report to the respective client computer 12, as indicated by an arrow 130. If the log-in information is accurate and valid, as determined at inquiry 126, administration module 18 retrieves current currency information in a step 132 and transmits the information to the newly logged-in client computer 12 (arrow 106). In addition, administration module 18 retrieves account information for the respective client or individual trader in a step 134 and initializes the client account by transmitting the account information to the respective client or trader (arrow 110). Finally, administration module 18 retrieves current trading information such as open trading offers and orders (including open stop bids and stop offers) in a step 136, that information being forwarded to the respective client or trader (arrow 114).

Figure 7:
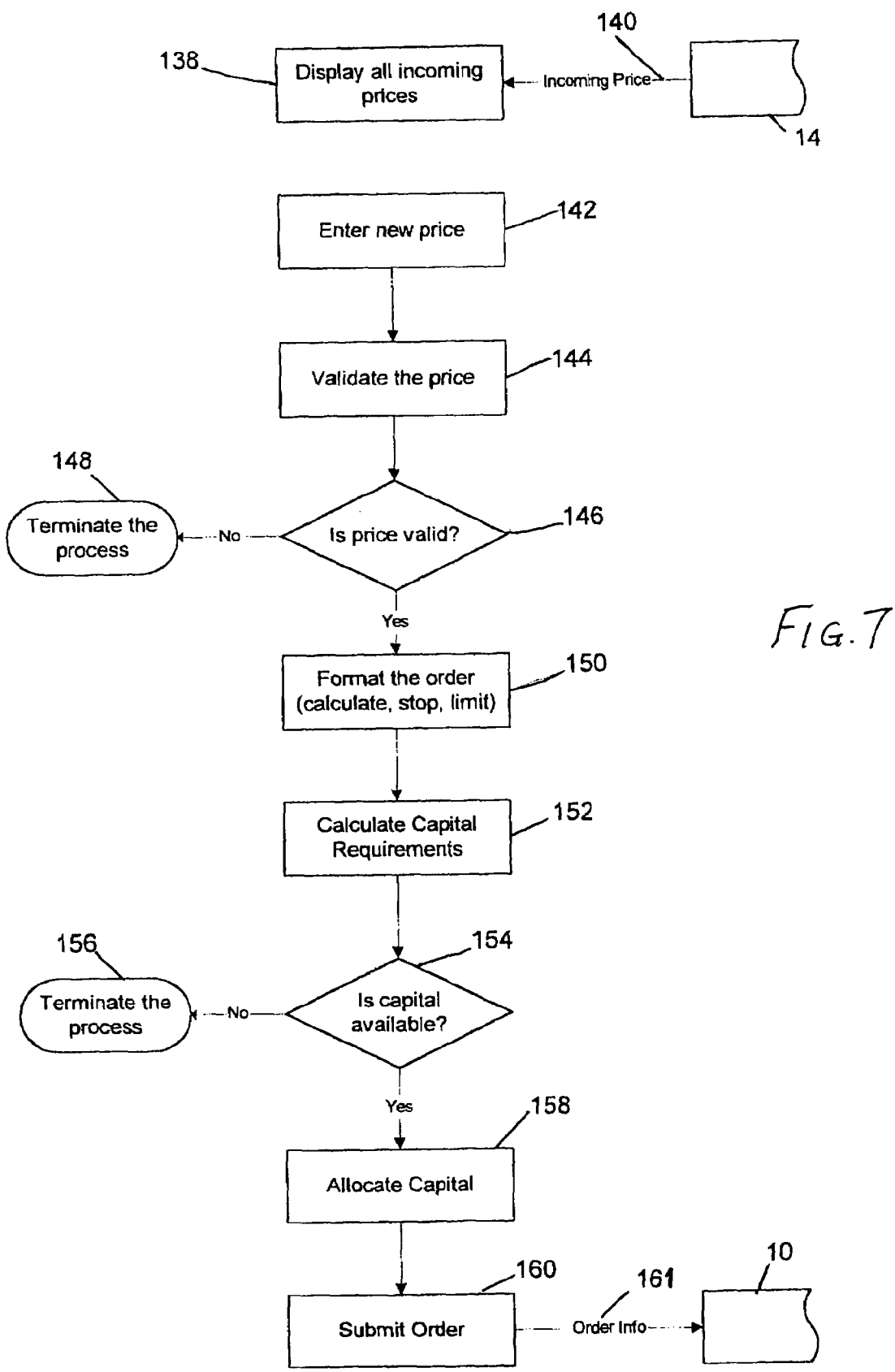
FIG. 7 is a flow chart diagram of an order submission process implemented by a client computer of FIG. 1 and more specifically by a trading book module shown in FIG. 3.

As illustrated in FIG. 7, trading book module 28 (FIG. 3) of client computer 12 executes a routine 138 to display of trading offers or offered prices in bid display rectangle 38 and offer display rectangle 40 (FIG. 4). The currency trading prices of incoming bids and offers, arriving over the Internet 14 (FIG. 1) as indicated in FIG. 7 by an arrow 140, are added into the bid list in rectangle 38 and the offer list in rectangle 40. In a step 142, trading book module 28 detects the entry of a new bid in windows 56 and 58 or a new offer in windows 64 and 66 by the respective individual trader. In a following validation step 144, trading book module 28 checks the entered price against the currently outstanding bids and offers to determine whether the entered price jibes with the current market. If trading book module 28 determines at a decision junction 146 that newly received bid or offer is outside the range of current bids and offers according to pre-established criteria, the trading book module rejects the entered price in a step 148. If trading book module 28 determines at decision junction 146 that newly received bid or offer is valid according to the pre-established criteria, the trading book module formats the order in a step 150. This formatting includes the determination of stop and/or limit values, as appropriate. In a subsequent step 152, trading book module 28 uses the stop and/or limit values and the total currency amount in the newly received bid or offer to calculate the capital requirements. That total currency amount required to cover the new bid or offer is compared with (e.g., subtracted from) the available amount in the individual trader's account at a decision junction 154. If the available capital is insufficient, trading book module 28 terminates the bid or offer submission process in a step 156. If sufficient capital is present in the individual trader's account, trading book module 28 reserves the required amount in an allocation step 158 and submits the bid or offer in a step 160 to server computer 10, as indicated by a transfer arrow 161, for relaying to participating traders.

Figure 8A:
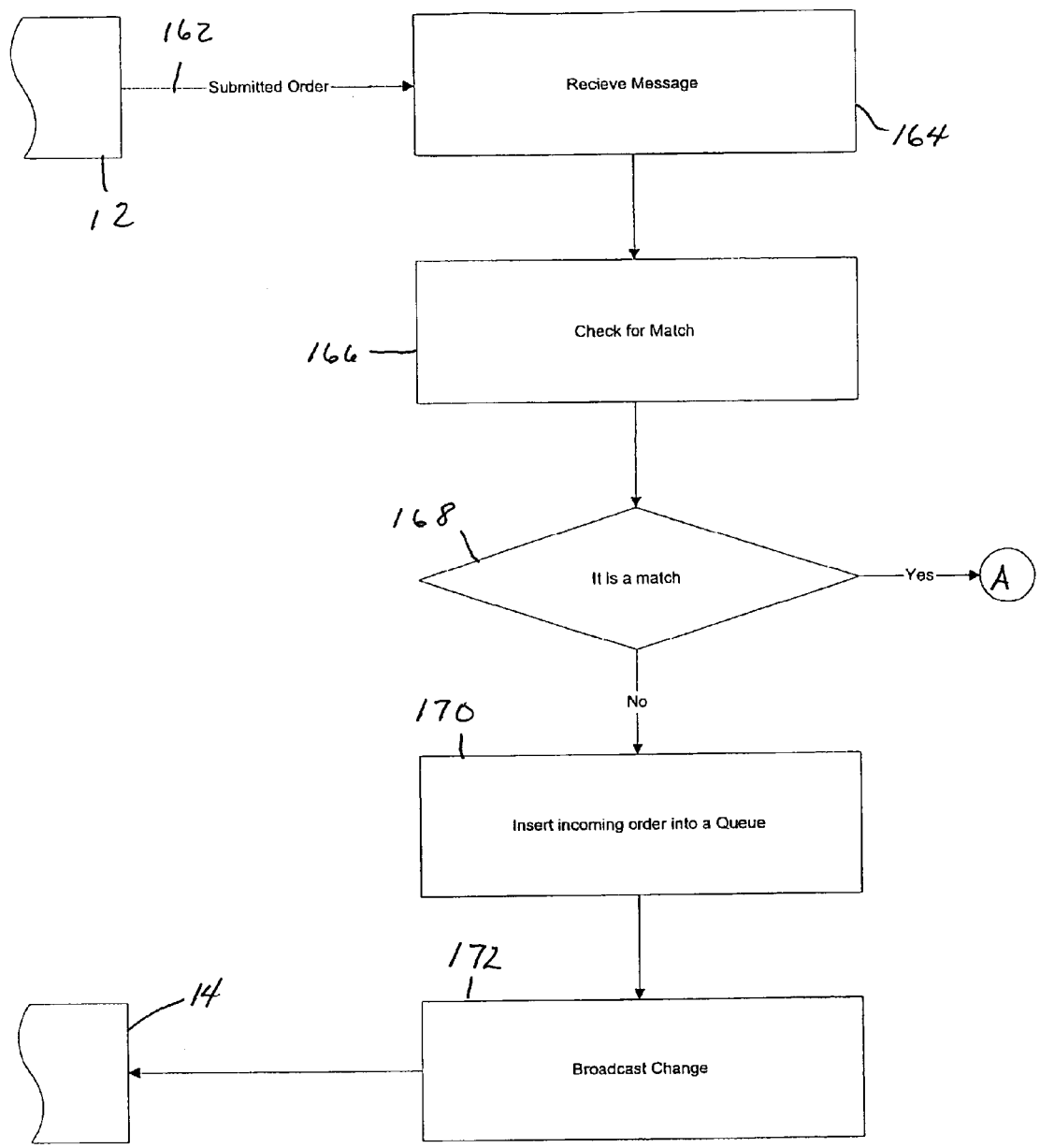
FIGS. 8A and 8B are a flow chart diagram of trading supervision or order implementation carried out by the server computer of FIG. 1 and more particularly by a trading module shown in FIG. 2.

In FIG. 8A, an incoming bid or offer transmitted to server computer 10 from a client computer 12 as indicated by an arrow 162 is received and recognized in a step 164 by trading module 20 (FIG. 2) of the server computer. In the case of an incoming bid, trading module 20 then compares the bid in a step 166 with currently open offers to determine whether the bid matches any offer. In the case of an incoming offer, trading module 20 compares the offer in step 166 with currently open bids to determine whether the offer matches any current bid. If at a decision junction 168 trading module 20 determines that there is no match between the incoming bid or offer and existing offers and bids, respectively, the trading module inserts the bid or offer into a respective queue in a step 170. Then, in a broadcast step 172, trading module 20 transmits the new bid or offer to all participating traders over the Internet 14.

Figure 8B:
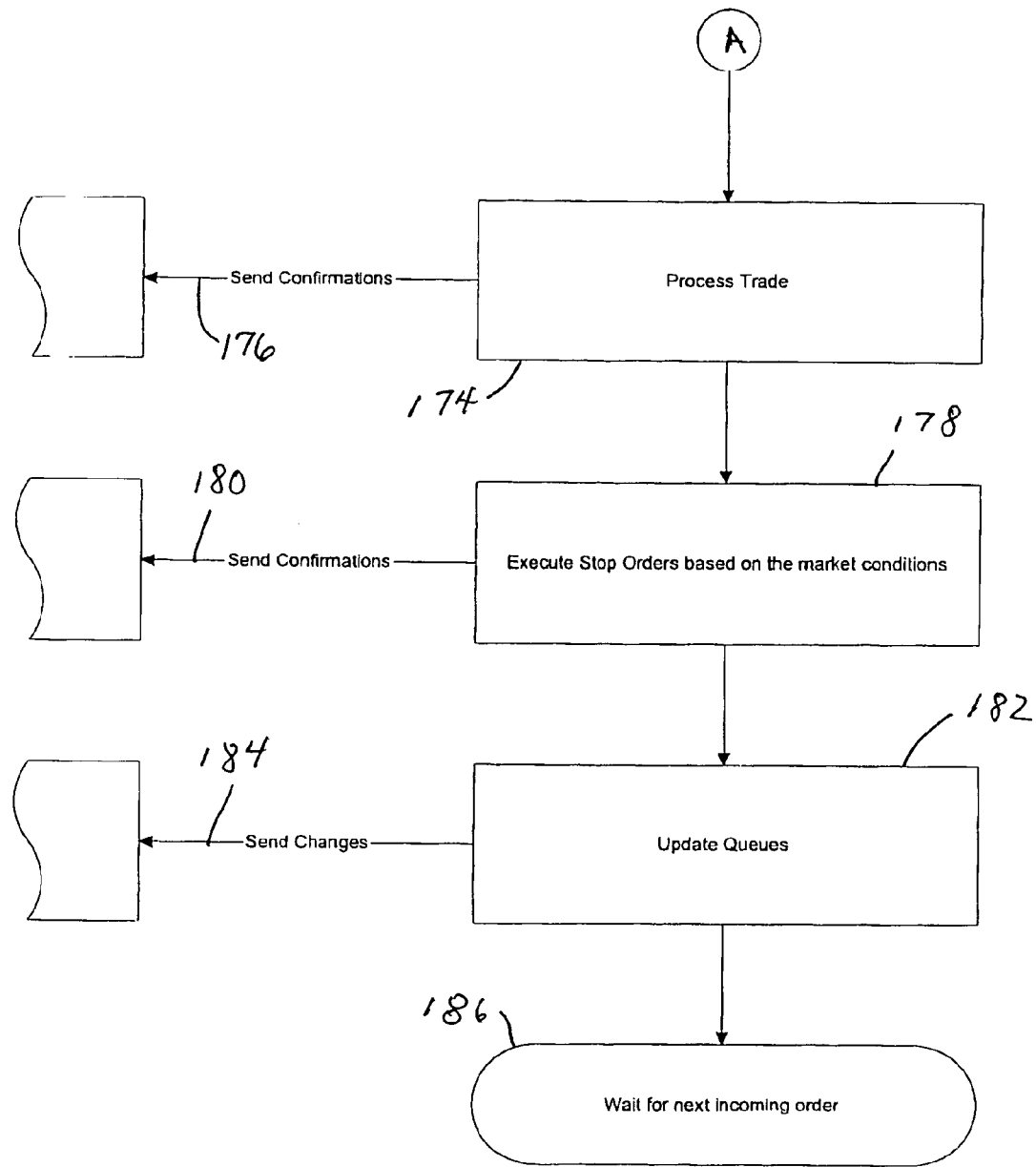

If at decision junction 168, trading module 20 determines that there is a match between a newly arrived bid or offer and a previously received but still outstanding offer or bid, respectively, the trading module processes the trade in a step 174 (FIG. 8B). This processing includes transmission of a transaction confirmation 176 to the traders who made the matching bid and offer. The processing in step 174 further includes (a) updating queues of bids and offers by a queue maintenance unit 282 (FIG. 13) and broadcasting of the updated queue information to participating traders on the network, (b) recalculating positions of the traders involved in the new match or trade, (b) creating or modifying stops for the new match or trade and inserting these new or modified stops in the appropriate stop queues, and (c) updating limits related to the new match or trade and inserting the limits in the bid and offer queues, as appropriate.

In a subsequent step 178, trading module 20 monitors stop queues to determine whether any stops should be executed according to current market conditions as evidenced by the immediately executed trade. Trading module 20 executes stop orders as appropriate and transmits confirmations, as indicated by an arrow 180, to the respective client computers 12. The relevant trading queues are then updated by trading module 20 in a step 182, with implementing signals being transmitted to participating traders as indicated by an arrow 184. The updated trading queues include the bid and offer lists shown in rectangles 38 and 40 of the client computer screens and further includes the lists of bids and offers in order of their placement, maintained by trading module 20 so as to execute earlier received bids (and offers) before later received bids (and offers). In a step 186, trading module 20 awaits the next incoming bid or offer.

Figure 9:
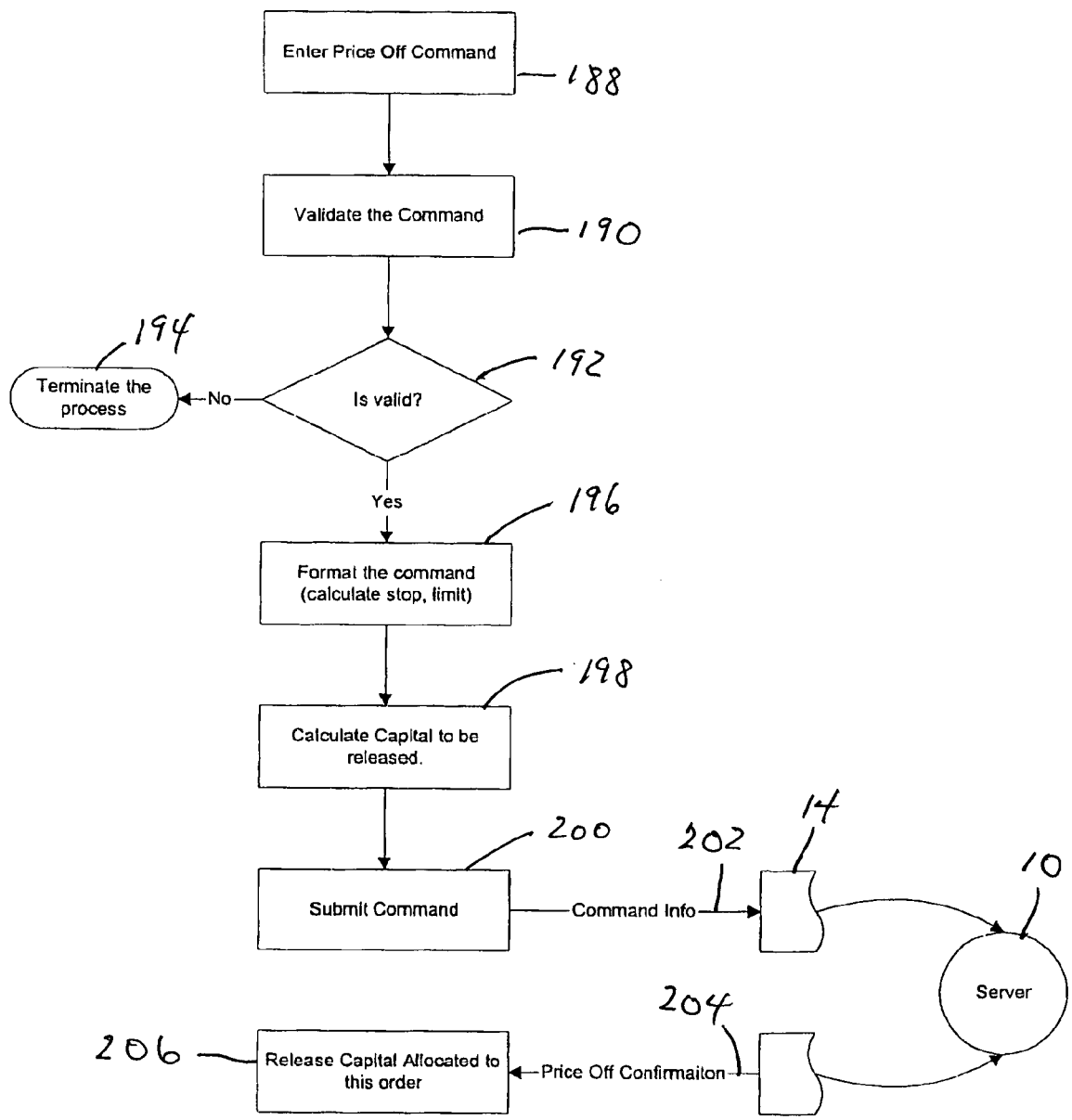
FIG. 9 is a flow chart diagram of an order cancellation process undertaken by a client computer of FIG. 1 and more specifically by a trading book module shown in FIG. 3.

An order cancellation process executed by trading book module 28 is diagramed in FIG. 9. In a step 188, trading book module 28 detects that the individual trader has actuated button 78 or 82 to cancel a bid or an offer made by that trader or that the individual trader has actuated button 80 to cancel both any outstanding bid and any outstanding offer of the trader. Trading book module 28 then checks in a step 190 as to the validity of the price-off command. If the command is invalid, as determined at a decision junction 192, trading book module 28 notifies the user or trader in a process-termination step 194 that the price-off command is not executable. This eventuality occurs, for instance, if the trader has no outstanding bid or offer owing perhaps to an earlier cancellation or a completion of a transaction. If the price-off command is valid, as determined at decision junction 192, trading book module 28 formats the command in a step 196 and thereby computes stop and limit amounts, as appropriate. In a subsequent step 198, trading book module 28 calculates the capital to be released (e.g., from an "escrow" account into the trader's main account) and, in a step 200, submits the previously formatted command over the Internet 14 to server computer 10, as indicated by an arrow 202. Upon adjustment in the trading queues maintained by server computer 10, the server computer transmits a confirmation signal back to communication module 24 (FIG. 3), as indicated by an arrow 204. In a step 206, the trading program in the client computer 12 releases the capital previously allocated to the canceled bid or offer.

Figure 10:
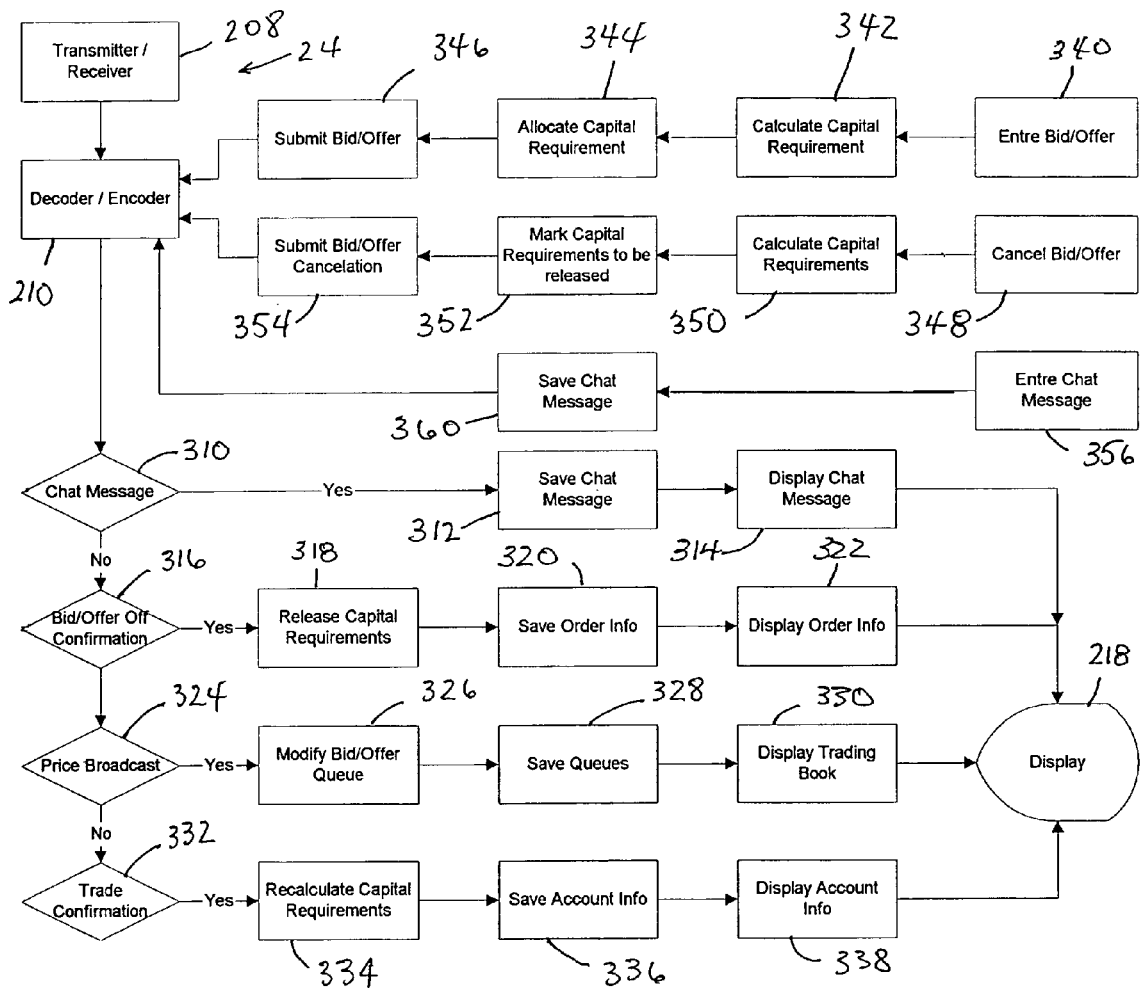
FIG. 10 is partially a block diagram and partially a flow chart diagram showing operations performed by a client or trader computer to implement a message or chat function and to track and update capital accounts.

As shown in FIG. 10, communication module 24 includes a transmitter/receiver 208 and a decoder/encoder 210. An incoming digital signal intercepted by transmitter/receiver 208 and preprocessed by decoder/encoder 210 is examined by client or trader computer 12 in an initial query 310 to determine whether the digital signal encodes a chat message. If query 310 results in a positive outcome, the chat message is saved in a step 312 and displayed in a step 314 on a schematically illustrated display or monitor 218. If query 310 results in a negative outcome, client computer 12 inquires at a decision junction 316 as to whether the incoming digital signal encodes a confirmation that a bid or offer made by the respective individual trader has been canceled. If there is an off confirmation, computer 12 releases previously allocated capital in a step 318, stores the executed order information in a step 320, and displays the order information in a step 322. If no termination signal is detected, the client or trader computer 12 checks at 324 as to whether the incoming digital signal encodes a price broadcast, i.e., a new trading order (bid or offer) to be incorporated into the bid queue or the offer queue displayed in rectangle 38 or 40. If check 324 uncovers a price broadcast, computer 12 modifies the respective queue in a step 326, saves the queues in a step 328, and displays the new trading book in a step 330. If check 324 fails to uncover a price broadcast, computer 12 determines in an investigation 332 whether the incoming digital signal encodes a confirmation of a trade by the respective individual trader. If so, the capital requirements of the trader are recalculated in a step 334 and that updated account information is stored in a step 336 and displayed in a step 338.

FIG. 10 further illustrates operations undertaken by a client or trader computer 12 in response to input from the respective trader. Computer 12 detects in a step 340 that the trader has entered a bid or an offer and undertakes a price validation sequence as discussed above with reference to numerical designations 144, 146, and 148. Subsequently, the capital requirements are computed in a step 342 should the bid or offer be executed upon, capital is allocated or reserved from the trader's available capital in a step 344, and the bid or offer is submitted to the server computer 10 in a step 346. If the individual trader cancels a bid or offer, as validated by the respective trader computer 12 in a step 348 (see reference numerals 190, 192, 194 and related discussion), new or updated capital requirements are calculated in a step 350, unnecessary allocated funds are released in a step 352, and the bid or offer cancellation is submitted to server computer 10 in a step 354. If the individual trader enters a chat message, as determined in a step 356, the chat message is saved in a step 360 and transmitted to server computer 10 for distribution to those traders participating in a respective chat session.

Figure 11:
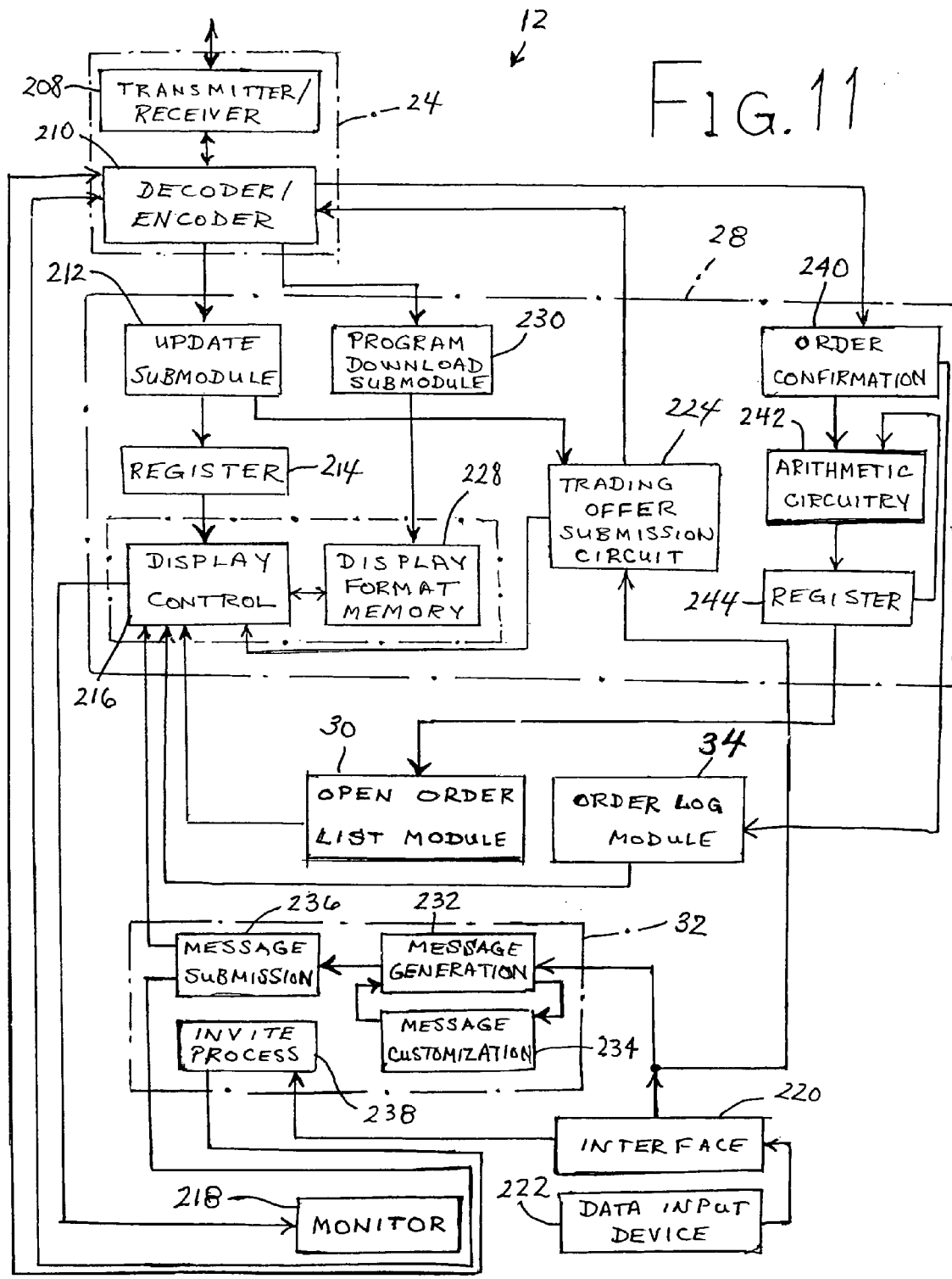
FIG. 11 is a block diagram showing, inter alia, selected details of the functional structure of a trading book module and a messaging control module shown in FIG. 3.

As illustrated in FIG. 11, trading book module 28 comprises an update submodule 212 operatively connected to an output of decoder/encoder 210 for receiving and recognizing trading data arriving from server computer 10 (FIGS. 1 and 2) via the Internet 14. More particularly stated, update module 212 includes circuits programmed to recognize that an incoming signal encodes bids and offers. Trading book module 28 additionally comprises a register or dedicated memory area 214 connected to update submodule 212 for storing a plurality of bids and a plurality of offers pertaining to trading of a common commodity such as a currency. Thus, upon the logging-in of a client computer 12, update module 212 receives a list of current pending bids and offers from administration module 18 of server computer 10. Subsequently, update submodule 212 sporadically receives queue update information for modifying the lists of bids and offers displayed in rectangles 38 and 40 (FIG. 4). All this information is stored in register 214 for display on a computer monitor 218.

As additionally illustrated in FIG. 11, trading book module 28 includes a display control 216 operatively connected to register 214 for displaying, inter alia, the current bids and the offers in a respective monotonic sequences on computer monitor 218. A command recognition circuit of interface 220 is operatively connected to a command input device 222 such as a keyboard or mouse for receiving and recognizing a trading offer (bid or offer) input by a trader. Command recognition circuit or interface 220 is operatively linked to display control 216 via a trading offer submission circuit 224. In response to signals from circuit 224, display control 216 causes an input bid or offer to be displayed in a visually detectible form on monitor 218. Submission circuit 224 incorporates command relay or formatting circuitry 226 (FIG. 12) operatively connected to the command recognition circuit or interface 220 and to the Internet 14, whereby a bid or offer from the individual trader is transmitted over the Internet to server computer 10.

Display control 216 includes or is connected to a memory 228 which stores at least that part of the trading program controlling the layout of the window or screen of FIG. 4. The display format of FIG. 4 is loaded into memory 228 by a program download submodule 230 connected at an input to communication module 24 and particularly decoder/encoder unit 210 thereof.

As shown in FIG. 11, messaging control module 32 includes a message generator 232 operatively connected to command recognition circuit or interface 220 for receiving text typed into data input device 222 in window 88 of the trading display (FIG. 4). Message generator 232 cooperates with a customization circuit 234 for assigning phrases to keys 92 and is connected to a message submission circuit 236 which feeds text to display control 216 for disposition of the text in chat window 84. Message submission circuit 84 is also connected to decoder/encoder 210 of communication module 24 for transmission of a chat message to message distribution module 22 of server computer 10 (FIG. 2). Messaging control module 28 further includes an invite process control 238 operatively connected to decoder/encoder 210 of communication module 24 for transmitting and receiving invitations to private chat groups.

In FIG. 11, reference numeral 240 designates an order confirmation circuit coupled to decoder/encoder 210 for receiving data identifying consummated transactions or completed orders. Transactions or trading orders are executed by server computer 10 and verified to client computers 12 via the Internet 14. A transaction is executed generally in response to a newly communicated trading order which has the same price as a previously tendered bid or offer. Thus, any given trader may participate in a transaction by either placing a trading order which matches a prior trading offer in price or by having another trader tender a trading order which matches in price an extant bid or offer of the given trader.

Order confirmation circuit 240 is connected at an output to arithmetic circuitry 242 in turn connected to another register or dedicated memory area 244. Arithmetic circuitry 242 calculates, in response to a transaction information from order confirmation circuit 240, a new position amount and an average price per unit and provides the calculated position amount and the calculated average price to register 244. Register 244 in turn transmits the new calculated position amount and the updated average price per unit to open order module 30 for display in windows 44, 46, 48, 50 (FIG. 4).

Order confirmation circuit 240 is connected to order log module 34 for updating the order log kept thereby. The updated order log is then displayed in window 94 (FIG. 4).

Figure 12:
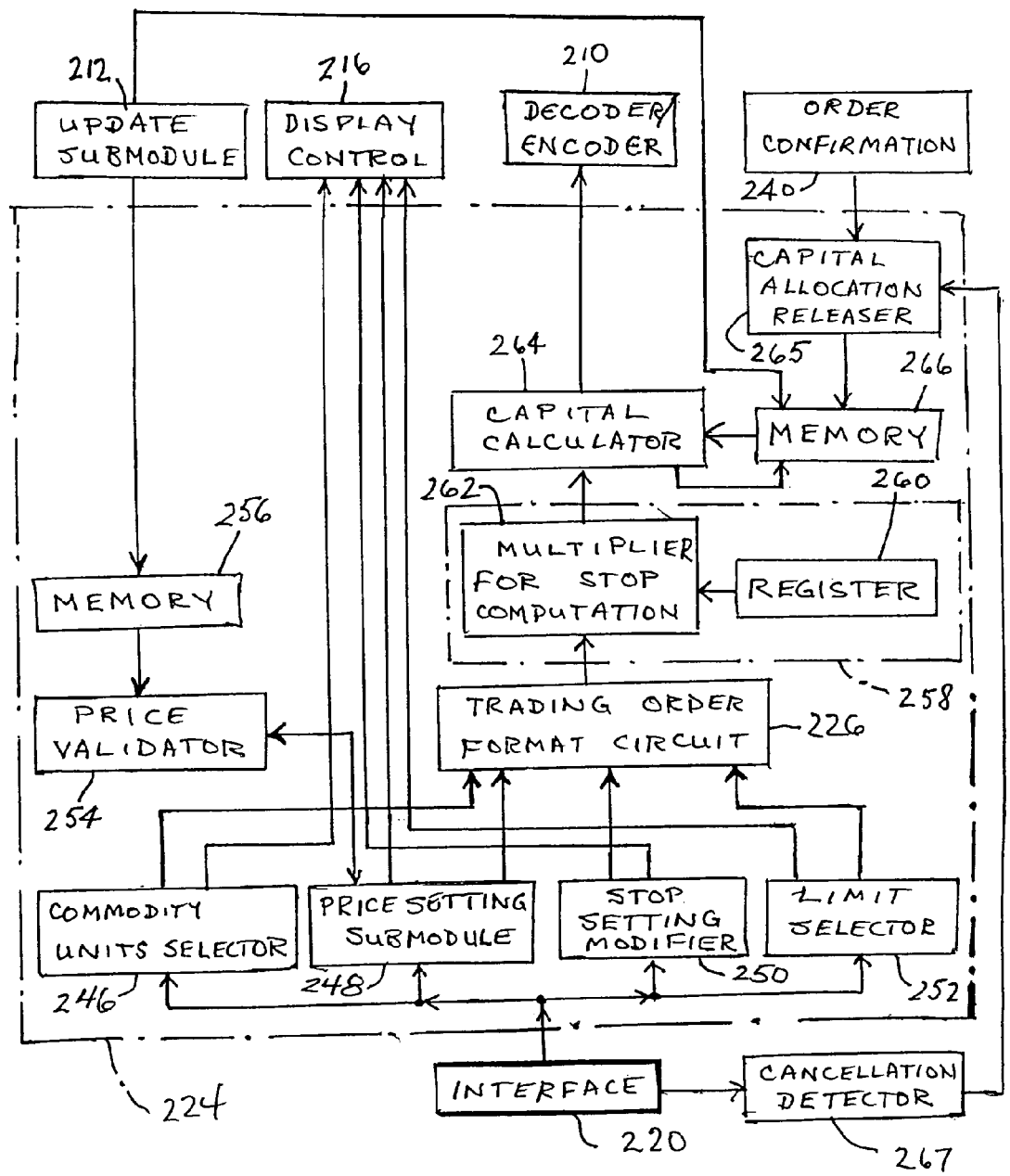
FIG. 12 is a block diagram of a trading offer submission circuit illustrated in FIG. 11.

FIG. 12 depicts details of the functional structure of trading offer submission circuit 224 of FIG. 11. Submission circuit 224 incorporates a commodity units selector 246 operatively connected to command recognition circuit or interface 220 for processing a number of units of a currency which is entered by the individual trader in window 58 or 66. Submission circuit 224 also incorporates a price setting submodule 248 operatively connected to command recognition circuit or interface 220 for processing a price or trading rate which is entered by the individual trader in window 56 or 64. In addition, submission circuit 224 includes a stop setting modifier 250 and a limit selector 252 operatively connected to command recognition circuit or interface 220 for respectively processing a stop value entered by the individual trader in window 62 and processing a limit value entered by the trader in window 70.

A price validation circuit 254 is operatively connected to price setting submodule 248 for determining that an entered price falls within an expected or re-established range given the current market conditions. Price validation circuit 254 receives market information from a memory 256 in turn loaded with bids and offers including outstanding bids and offers as well as recently terminated bids and offers.

Commodity units selector 246, price setting submodule 248, stop setting modifier 250 and limit selector 252 are all connected at their outputs to trading order format circuit 226. Trading offer submission circuit 224 further comprises a stop computation circuit 258 operatively connected to trading order format circuit 226 for automatically computing a total stop amount for a bid or offer. Stop computation circuit 258 includes a register or dedicated memory area 260 storing a default stop per unit of the currency and a multiplier 262 connected to register 260 and to trading order format circuit 226 for multiplying the identified number of units of the currency in the current bid or offer by the default stop stored in register 260. The default stop value in register 260 is used only where the bid or offer being processed fails to include an identification of a stop amount per currency unit. Otherwise, multiplier 262 uses the identified stop value selected by the trader via window 62 for computing the total stop amount for the bid or offer.

At an output of stop computation circuit 258 is a capital calculator 264 for determining whether the current amount in the trader account is sufficient to cover the bid or offer being processed. To that end, calculator 264 functions as a differencing circuit or comparator which consults a memory 266 storing the current amount in the trader's account. Calculator 264 comparing the total stop amount determined by stop computation circuit 258 with the amount in memory 266. If the balance amount is greater than the stop amount, calculator 264 modifies the account information in memory 266 by reserving or allocating the computed total stop amount in the event that a stop order is undertaken by server computer 10 on the client's position. Calculator 264 is operatively connected to decoder/encoder 210 for relaying the trading offer (bid or offer) including the stop value and the new account information to server computer 10. Capital calculator 264 is also connected to display control 216 at least for purposes of inducing display of an insufficient funds message in the event that the balance in the trader's account is insufficient to cover the total stop amount. In such an event, the trading offer entered by the individual trader via input 222 (FIG. 11) is not forwarded to the sever computer and does not appear in the bid rectangle 38 or offer rectangle 40 of any trader.

Allocated capital determined by calculator 264 in response to a trading offer input by the individual trader is released in memory 266 and returned to an available funds account therein by a capital release module 265. Module 265 acts to release allocated funds in response to a bid or offer cancellation made by the respective trader and recognized by a cancellation detector 267 connected to interface 220 on an input side and to capital allocation release module 265 on an output side. In response to a communication from server computer 10 that a trade has been executed on a bid or offer made by the trader, module 265 also acts to release allocated finds and to recalculate profit and loss. Capital allocation release module 265 is connected at an input to order confirmation circuit 240.

Figure 13:
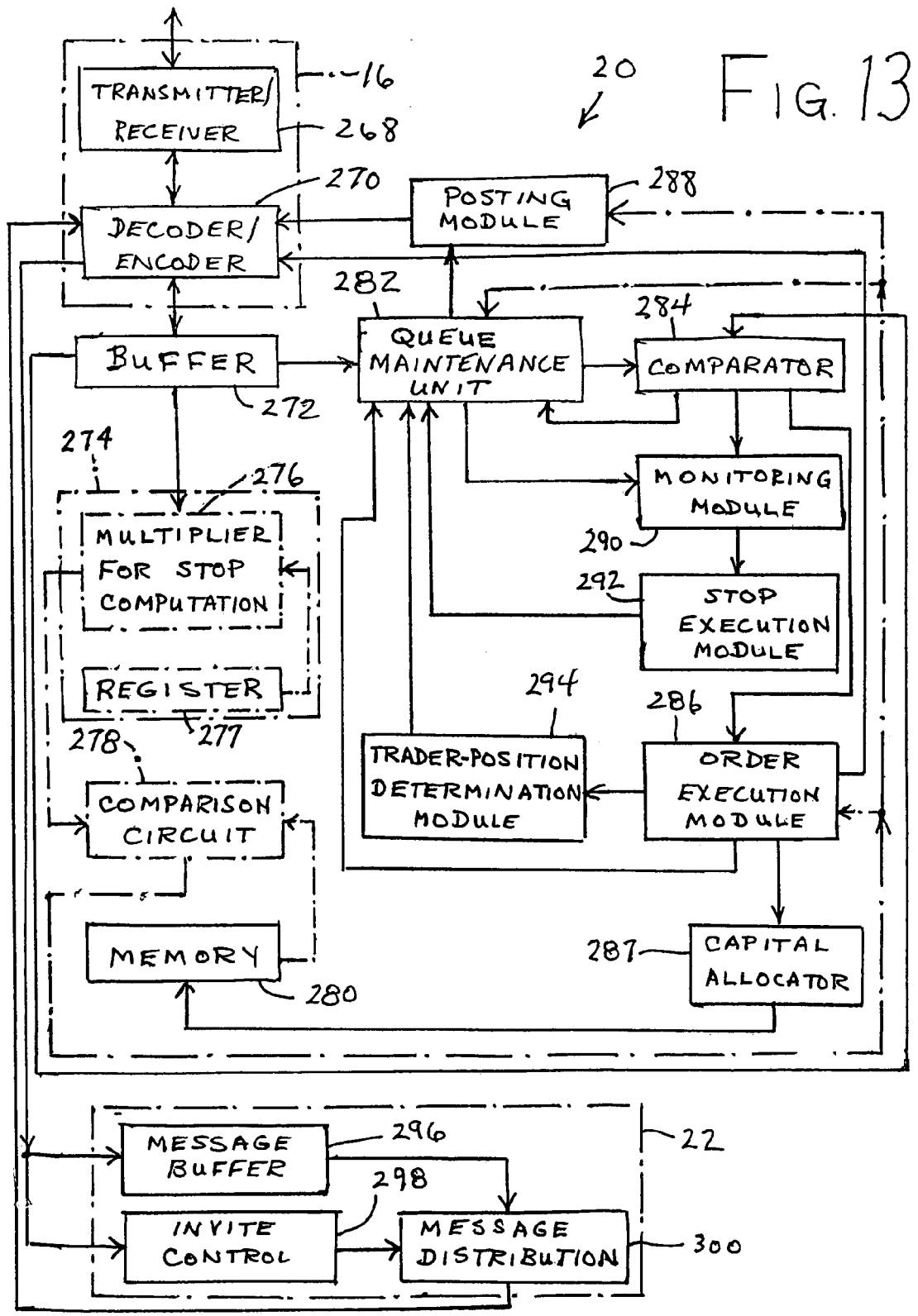
FIG. 13 is a block diagram of selected functional blocks of a trading module illustrated in FIG. 2.

As illustrated in FIG. 13, communication module 16 of server computer 10 includes a transmitter/receiver 268 for broadcasting to and receiving trading information from on-line or logged-in traders. Communication module 16 also includes a decoder/encoder 270 for decoding or encrypting incoming data signals and encoding or encrypting outgoing data signals. A buffer circuit 272 included in trading module 20 receives and temporarily stores decoded incoming trading information. Long-term storage is effectuated by database 122 (FIG. 6). Trading module 20 optionally includes a stop computation circuit 274 including a multiplier 276 and a register or dedicated memory area 277 storing default stop values for the different traders and different tradable currencies. A comparison circuit or capital calculator 278 is connected to an output of multiplier 276 for determining whether the account of a trader making a bid or an offer includes sufficient funds to cover a stop order, should it become necessarily to execute the stop order on the trader's position. Comparison circuit 278 is connected to a memory 280 which stores client account information.

As further illustrated in FIG. 13, trading module 20 of server computer 10 additionally includes a queue maintenance unit 282 operatively tied to communication module or interface 16 via buffer circuit 272 for supervising a queues bids and offers. Queue maintenance unit 282 orders or lists the bids and offers by price per commodity unit and the times at which the respective bids and offers were extended. This ordering facilitates the supervision of the trading process by server computer 10 and the appropriate and timely execution of trading orders.

Trading module 20 further comprises a comparator 284 operatively connected to queue maintenance unit 282 for periodically comparing the outstanding or currently valid bids with the outstanding or currently valid offers to determine whether a match has occurred. In the event a match is detected by comparator 284, the comparator provides a signal to an order execution module 286. Order execution module 286 is connected to a capital allocator 287 which is in turn connected to memory 280 for modifying accounts of traders who made a matching bid and offer to sell. Allocator 287 reserves funds in memory 280 upon execution of a trade. Order execution module is coupled to queue maintenance module 282 for removing the matching bid and offer from the list of outstanding or valid bids and the list of outstanding or valid offers. In addition, order execution module 286 is tied to decoder/encoder 270 for transmitting signals over the Internet 14 (FIG. 1) to advise all logged-in traders of the match. Order execution module may be connected directly to decoder/encoder 270 or indirectly via a posting module 288. Comparison circuit 278 is connected to posting module 288 for advising traders of stop information, to order execution module 286 for providing stop information thereto in the event that a stop order must be executed, and to queue maintenance unit 282.

Queue maintenance unit 282 also maintains a queue of stop bids and a queue of stop offers, while trading module 20 additionally comprises a monitoring module 290 operatively connected to comparator 284 and queue maintenance unit 282 for monitoring the stop bids and the stop offers in relation to any order which has just been executed, to determine whether any of the stop bids and the stop offers should be executed. A consummated trade is evidence of a change in market conditions and the current exchange rate for a currency being traded. When the market changes, the stop positions of the traders participating on the network must be investigated to determine whether a stop must be executed. A stop execution module 292 is operatively coupled to monitoring module 290 and to queue maintenance unit 282 for executing stops at appropriate times and for modifying a respective queue of stop bids or stop offers.

Trading module 20 further comprises a position determination module 294 operatively connected to order execution module 286 for computing, upon detection by comparator 284 of a matching bid and order to sell, positions of the traders who made the matching bid and offer to sell and further computing stops associated with the computed positions. Position determination module 294 is operatively connected to queue maintenance module 282 for updating the queue of stop bids and the queue of stop offers to incorporate the computed stops. Modifications in the queues are transmitted by queue maintenance unit 282 over the Internet 14 via posting module 288 and communication module 16.

As further illustrated in FIG. 13, message distribution module 22 (FIG. 2) more specifically includes a message buffer 296 operatively connected to decoder/encoder 270 for receiving and temporarily storing all incoming messages including but not limited to chat messages. An invite control 298 receives instructions from invite process 238 (FIG. 11) and builds lists of chat room participants in response to those instructions. In response to signals from invite control 298, a distribution unit or router 300 directs messages from buffer 296 to appropriate selected trader participants.

Although the invention has been described in terms of particular embodiments and applications, one of ordinary skill in the art, in light of this teaching, can generate additional embodiments and modifications without departing from the spirit of or exceeding the scope of the claimed invention. For example, the various computer components described herein may be realized in the form of hard-wired dedicated circuits, rather than program-modified generic digital computer circuits. Also, it is to be noted that various functions of a system for electronically trading a commodity as described herein may be performed either centrally by a server computer or in distributed fashion by trader computers. Thus, a client or trader computer cooperate to perform all necessary functions in a commodity trading system. The server computer, to conserve processing power and time, may distribute the responsibility for executing various functions to the client computers. Alternatively, where the server computer has a prodigious processing capacity, functions otherwise delegated to the client or trader computers may be performed at a central location. Functions which are shiftable between the server computer and the trader computers include stop, limit and slippage computations, position monitoring, profit and loss calculation, etc.

A client trading program as described herein, including a routine or subprogram for enabling and controlling the displaying of bids and offers on a trader's computer monitor may be downloaded via the Internet, as described above, or loaded by CD or floppy disks.

The method and apparatus described herein may be used to implement electronic, on-line, real-time trading for commodities other than currencies, agricultural commodities, for instance.

Accordingly, it is to be understood that the drawings and descriptions herein are proffered by way of example to facilitate comprehension of the invention and should not be construed to limit the scope thereof.

What is claimed is:

1. A method for trading a commodity, comprising:
receiving, in encoded form via a computer network, a plurality of bids and a plurality of offers pertaining to a common commodity;
displaying the bids and offers on a computer monitor;
generating a trading offer including a trading rate or price per unit of the commodity, and a number of units of the commodity, the trading offer additionally including identification of the stop value as a stop amount per unit of the commodity;
automatically calculating a total stop amount for the trading offer, the total stop amount being a monetary amount required to cover a stop execution on the trading offer, the total stop amount including a primary quantity equal to a stop value multiplied by the number of units of the commodity included in the trading offer;
automatically comparing the total stop amount with an available amount in a client or trader account; and
transmitting a digital signal encoding the trading offer over the computer network for distribution to multiple traders.

2. The method defined in claim 1 wherein the calculating of the total stop amount includes computing the primary quantity and a slippage amount.

3. The method defined in claim 2 wherein the calculating of the slippage amount includes automatically multiplying a default slip per unit of the commodity times the identified number of units of the commodity in the trading offer.

4. The method defined in claim 1, further comprising automatically allocating or reserving the total stop amount from the available amount in the client or trader account.

5. The method defined in claim 4, further comprising canceling at least a portion of the trading offer and automatically returning at least a portion of the allocated or reserved amount to the client or trader account upon such cancellation.

6. The method defined in claim 1 wherein the digital signal is transmitted upon and only upon a determination that the total stop amount is less than the available amount in the client or trader account.

7. The method defined in claim 1 wherein the transmitting of the digital signal includes directing the digital signal to a server computer connected to the computer network, the server computer distributing the trading offer to the traders.

8. The method defined in claim 1, further comprising:
displaying on the monitor a prompt for entry of a stop value; and
determining that a respective stop value has been selected for the trading offer,
forwarding, via the computer network, the respective stop value to a server computer together with the trading offer.

9. The method defined in claim 1, further comprising:
displaying on the monitor a prompt for entry of a limit value; and
determining that a respective limit value has been selected for the trading offer,
forwarding, via the computer network, the respective limit value to a server computer together with the trading offer.

10. The method defined in claim 1, further comprising:
displaying on the monitor a prompt for entry of a time period for which the trading offer remains valid and capable of being accepted;
determining that a respective time period has been selected for the trading offer;
determining when the time period is terminated; and
canceling the trading offer upon termination of the time period.

11. A method for trading a commodity, comprising:
receiving, in encoded form via a computer network, a plurality of bids and a plurality of offers pertaining to a common commodity;
displaying the bids and offers on a computer monitor;
generating a trading offer including a trading rate or price per unit of the commodity, and a number of units of the commodity;
automatically calculating a total stop amount for the trading offer, the total stop amount being a monetary amount required to cover a stop execution on the trading offer, the total stop amount including a primary quantity equal to a stop value multiplied by the number of units of the commodity included in the trading offer;
automatically comparing the total stop amount with an available amount in a client or trader account; and
transmitting a digital signal encoding the trading offer over the computer network for distribution to multiple traders, the generating of the trading offer and the comparing (if the total stop amount with the available amount in the client or trader account being performed by a client or trader computer connected to the computer network.

12. A method for trading currencies, comprising:
receiving, via a computer network, digital signals together encoding a plurality of bids and a plurality of offers pertaining to a common currency;
displaying the bids in a first monotonic sequence on a computer monitor;
simultaneously displaying the offers in a second monotonic sequence on the computer monitor;
monitoring a computer input device;
upon detecting a signal from the input device of a predetermined type encoding a trading order for requesting a transaction on one of the bids and the offers, automatically calculating a total currency amount for carrying out the order and comparing the total currency amount with a capital amount available in a given account to determine if the capital amount is sufficient; and
upon and only upon determining that sufficient capital is available in the account, transmitting an order signal over the computer network to a server computer, the order signal encoding the trading order for requesting a transaction on the one of the bids and the offers.

13. The method defined in claim 12, further comprising:
displaying on the monitor a plurality of prompts for particulars of a trading offer, the prompts including prompts to enter a price per unit of the currency and a total number of units of the currency;
determining entry via the input device of a trading offer including at least a price per currency unit and a total number of currency units; and
forwarding the trading offer over the computer network to multiple other traders on the computer network.

14. The method defined in claim 13, further comprising:
displaying on the monitor a prompt for entry of a stop value; and
determining that the trading offer includes a respective stop value,
the forwarding the trading offer including transmission of the respective stop value to the server computer.

15. The method defined in claim 13, further comprising:
displaying on the monitor a prompt for entry of a limit value; and
determining that the trading offer includes a respective limit value, the forwarding the trading offer including transmission of the respective limit value to the server computer.

16. The method defined in claim 13, further comprising:
displaying on the monitor a prompt for entry of a time period for which the trading offer remains valid and capable of being accepted;
determining that the trading offer includes a respective time period;
determining when the time period is terminated; and
canceling the trading offer upon termination of the time period.

17. The method defined in claim 12 wherein the computer network is a global computer network, further comprising downloading from the computer network a program enabling and controlling the displaying of the bids and the offers on the computer monitor in response to the digital signals.

18. A method for use in trading currencies, comprising:
displaying, on a computer monitor connected to a computer in turn connected to a computer network, a plurality of prompts for particulars of a trading offer, the prompts including prompt to enter a price per unit of a currency and a total number of units of the currency;
determining entry, via an input device of the computer, of a trading offer including at least a price per currency unit and a total number of currency units;
automatically determining whether sufficient capital exists in a given account of a trader utilizing the computer, to cover a trade executable on the trading offer for the total number of currency units; and
upon and only upon determining that sufficient capital exists in the given account, forwarding the trading offer over the computer network to other traders on the computer network.

19. The method defined in claim 18, further comprising:
displaying on the monitor a prompt for entry of a stop value; and
determining that the trading offer includes a respective stop value,
the forwarding the trading offer including transmission of the respective stop value to the server computer.

20. The method defined in claim 18, further comprising:
displaying on the monitor a prompt for entry of a limit value; and
determining that the trading offer includes a respective limit value,
the forwarding the trading offer including transmission of the respective limit value to the server computer.

21. The method defined in claim 18, further comprising:
displaying on the monitor a prompt for entry of a time period for which the trading offer remains valid and capable of being accepted;
determining that the trading offer includes a respective time period;
determining when the time period is terminated; and
canceling the trading offer upon termination of the time period.

22. A currency trading method comprising:
receiving at a server computer a first digital signal over a computer network from a client's computer, the first digital signal encoding a trading offer including identification of a currency, a trading rate or price per unit of the currency, and a number of units of the currency;
operating the server computer to maintain (i) a first queue of bids ordered by price per currency unit and times of extending of the respective bids and (ii) a second queue of offers to sell ordered by price per currency unit and times of extending of the respective offers to sell;
operating the server computer to determine whether the trading offer matches any entry in the first queue and the second queue; and
upon detection by the server computer of a match between the trading offer and a particular entry in the one of the first queue and the second queue, operating the server computer to (a) modify accounts of traders who made the trading offer and the particular entry, (b) remove the particular entry from the one of the first queue and the second queue, (c) transmit signals over the computer network to advise all logged-in traders of the match, and (d) sending specific confirmation to the traders who made the trading offer and the particular entry.

23. The method defined in claim 22, wherein the trading offer is placed in a respective one of the first queue and the second queue upon receiving of the trading offer at the server computer, the operating of the server comp liter to determine whether the trading offer matches any entry in the first queue and the second queue including comparing the bids to the offers to sell to determine whether a match has occurred, the server being operated, upon detection by the server computer of the match between the trading offer and the particular entry, to remove the trading offer and the particular entry from respective ones of the first queue and the second queue.

24. The method defined in claim 22, further comprising operating the server computer to:
log in traders as log-in request arrive;
supervise the establishment of multiple private chat forums; and
distribute messages among logged-in traders according to established chat forums.

* * * * *